(12) United States Patent
Choudhary et al.

(10) Patent No.: US 11,995,669 B2
(45) Date of Patent: May 28, 2024

(54) METHOD AND SYSTEM FOR SIMULATING FULFILLMENT OF DIGITAL ORDERS

(71) Applicant: Target Brands, Inc., Minneapolis, MN (US)

(72) Inventors: Suman Kishore Choudhary, Plymouth, MN (US); Karthik Rajpurohit, Plymouth, MN (US); Utkarsh Gupta, Bengaluru (IN)

(73) Assignee: Target Brands, Inc., Minneapolis, MN (US)

( * ) Notice: Subject to any disclaimer, the term of this patent is extended or adjusted under 35 U.S.C. 154(b) by 216 days.

(21) Appl. No.: 17/724,702

(22) Filed: Apr. 20, 2022

(65) Prior Publication Data
US 2023/0342795 A1    Oct. 26, 2023

(51) Int. Cl.
*G06Q 30/0202*    (2023.01)
*G06Q 10/0834*    (2023.01)
(Continued)

(52) U.S. Cl.
CPC ... *G06Q 30/0202* (2013.01); *G06Q 10/08345* (2013.01); *G06Q 10/087* (2013.01); *G06Q 30/0631* (2013.01)

(58) Field of Classification Search
CPC .......... G06Q 30/0202; G06Q 30/0631; G06Q 10/08345; G06Q 10/087
See application file for complete search history.

(56) References Cited

U.S. PATENT DOCUMENTS

| 5,946,662 A | 8/1999 | Ettl et al. |
| 7,092,929 B1 | 8/2006 | Dvorak et al. |
| 7,124,101 B1 * | 10/2006 | Mikurak ............ G06Q 10/0631 |
| | | 705/7.12 |

(Continued)

FOREIGN PATENT DOCUMENTS

| CA | 2684304 C | 3/2018 |
| CN | 112613934 A | 4/2021 |

(Continued)

OTHER PUBLICATIONS

Nichols et al. "Realistic Market Basket Data Simulation for Retail Marketing" (2018) (https://trace.tennessee.edu/cgi/viewcontent.cgi?article=3245&context=utk_chanhonoproj) (Year: 2018).*

*Primary Examiner* — Sujay Koneru
(74) *Attorney, Agent, or Firm* — Merchant & Gould P.C.

(57) ABSTRACT

Methods and systems for simulating fulfillment of digital orders within a retail supply chain are disclosed. One method includes receiving a selection of a first operational parameter of a supply chain model. The supply chain simulation model is a transaction-level model representative of a digital order fulfillment process within a retail supply chain network. The selection of the first operational parameter includes a default value for the first operational parameter and an experimental value for the first operational parameter that is different from the default value. Simulations of a set of predicted digital orders within the retail supply chain network, using the supply chain simulation model as modified in accordance with the first operational parameter, are performed. Scenario evaluations including predicted metrics associated with each of a cost, a capacity, and a guest experience for the digital order fulfillment process may be output and displayed on a user interface.

20 Claims, 17 Drawing Sheets

(51) Int. Cl.
*G06Q 10/087* (2023.01)
*G06Q 30/0601* (2023.01)

(56) References Cited

U.S. PATENT DOCUMENTS

| | | | |
|---|---|---|---|
| 8,494,823 B2 | 7/2013 | Ding et al. | |
| 10,685,319 B2* | 6/2020 | Brereton | G06Q 10/067 |
| 10,770,899 B2 | 9/2020 | Sheble | |
| 2003/0009416 A1* | 1/2003 | Mara | G06Q 10/06 705/37 |
| 2006/0184608 A1* | 8/2006 | Williams | G06Q 30/02 709/203 |
| 2010/0115490 A1* | 5/2010 | Wilcock | G06F 8/10 717/104 |
| 2010/0125487 A1 | 5/2010 | Sinclair et al. | |
| 2013/0110668 A1* | 5/2013 | Hart | G06Q 30/00 705/26.5 |
| 2013/0211870 A1* | 8/2013 | Lawson | H04L 43/14 705/7.25 |
| 2014/0278706 A1* | 9/2014 | Leidner | G06Q 10/06315 705/7.25 |
| 2015/0120368 A1* | 4/2015 | Agrawal | G06Q 10/06315 705/7.25 |
| 2015/0332479 A1* | 11/2015 | Gershon | G06T 7/11 382/164 |
| 2016/0065419 A1* | 3/2016 | Szilagyi | H04L 69/02 709/224 |
| 2016/0171398 A1 | 6/2016 | Eder | |
| 2017/0039500 A1* | 2/2017 | Leidner | G06Q 10/0833 |
| 2020/0126015 A1* | 4/2020 | Anandan Kartha | G06Q 10/087 |

FOREIGN PATENT DOCUMENTS

| | | | | |
|---|---|---|---|---|
| CN | 113313531 A | * | 8/2021 | ......... G06F 16/9535 |
| JP | 2009134468 A | | 6/2009 | |

* cited by examiner

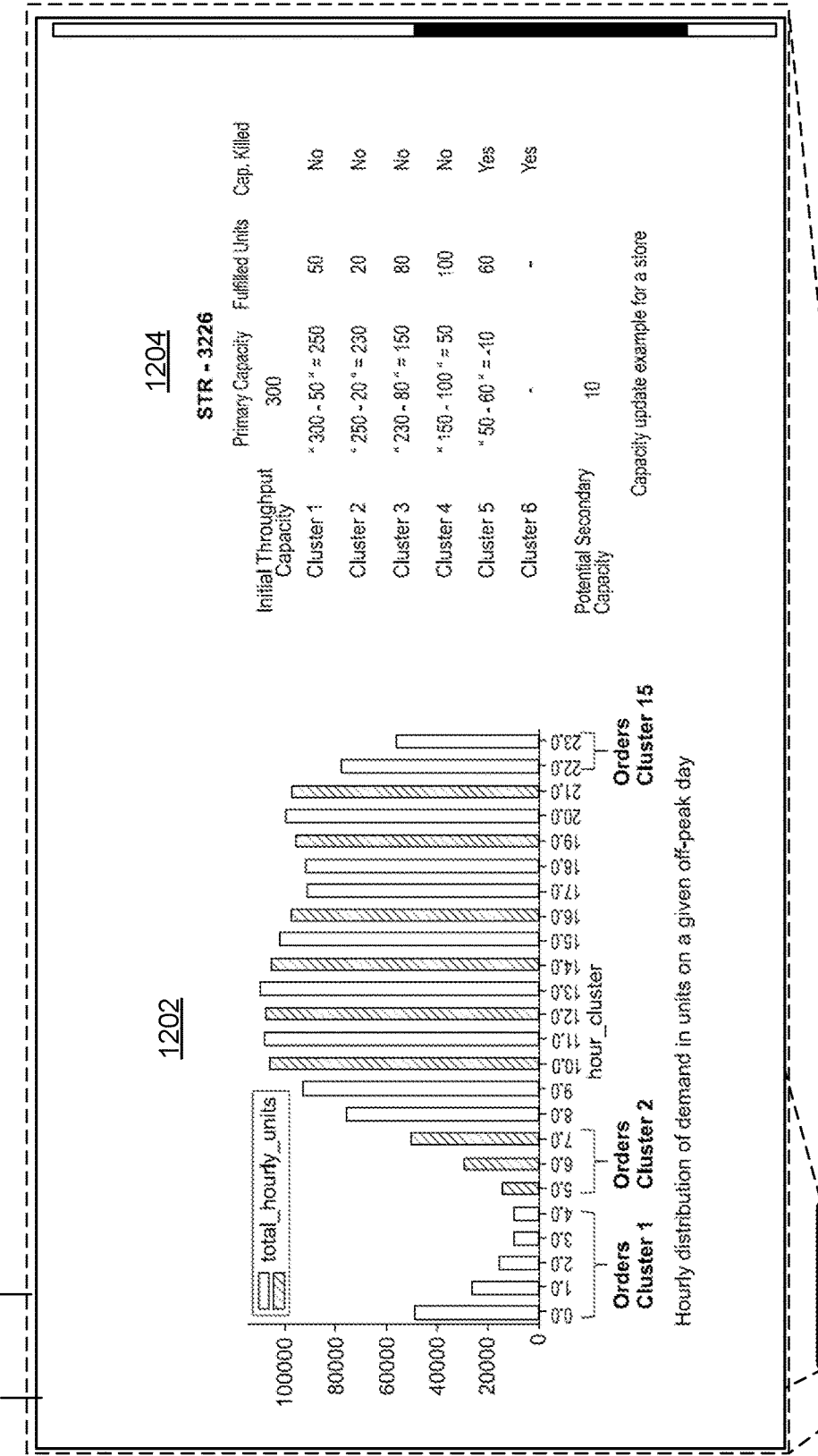
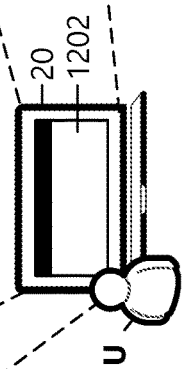
FIG. 12

| | Problem | Scenarios Explored | Recommendation |
|---|---|---|---|
| Carrier Diversification | Peak carrier capacity Gap of 26.8M packages | 1. Activating combination of FedEx, EHM, Ontrac<br>2. Multiple rate card offsets to push more volume out of UPS | • Activate Fedex EHM in 856 stores<br>• Introduce cost offset to move additional volume to EHM |
| Non-con item fulfillment | 1.2K non-con assortment drives 10% lower productivity in FCs | 1. Crossover fulfilled from SFS only<br>2. Online-Only fulfilled from SA only<br>3. Both | • Headwind of ($2M) in last mile expense impact is balanced by operation efficiency to a net impact of ($0.6M) impact in 2020 |
| DVS optimization | 72% of the DVS packages shipped via Ground service while only 7% is optimal. | 1. Optimize with Fedex Home<br>2. Optimize with Surepost<br>3. Both | • YTD ~4M savings with Fedex HD and Surepost activation |

UI 1304 Display 1306

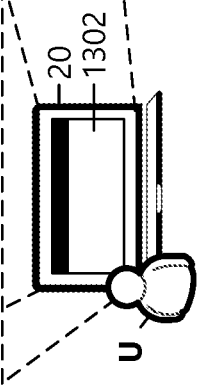

FIG. 13

METHOD AND SYSTEM FOR SIMULATING FULFILLMENT OF DIGITAL ORDERS

BACKGROUND

Consumers often purchase goods online by placing a digital order through a retail website. After a digital order is placed, units of inventory flow through a supply chain network of a retail enterprise before reaching a consumer. A supply chain network may be comprised of nodes, including distribution centers, mixing centers, and stores. Units of inventory may flow from a node in the supply chain network to a customer address through a digital order fulfillment process.

The timing and logic of fulfilling digital orders is complex. For example, there are many parameters or variables that may have an effect on the shipment and delivery of inventory items, such as node of origin, carrier, shipping cost, and box size. Moreover, in supply chain systems of significant size and complexity, decisions regarding how best to fulfill digital orders are highly complex due to changes in factors such as inventory availability at each node, shipping rates, and availability of carriers. Accordingly, it can be difficult to visualize or model how changing one factor or parameter in a digital order fulfillment process may affect the fulfillment of digital orders in a supply chain network in terms of cost, capacity, and customer satisfaction. There is currently not a convenient way for retailers to simulate digital orders with an adequate level of detail to inform decision making within a supply chain network.

Accordingly, it is with respect to these and other general considerations that embodiments have been described.

SUMMARY

In general, the present disclosure relates to a digital order simulation tool. In a first aspect, example methods for simulating fulfillment of digital orders within a retail supply chain network are described. An example method includes receiving a selection of a first operational parameter of a supply chain simulation model, the supply chain simulation model being a transaction-level model representative of a digital order fulfillment process within a retail supply chain network, the selection of the first operational parameter including a default value for the first operational parameter and an experimental value for the first operational parameter that is different from the default value; simulating execution of a set of predicted digital orders within the retail supply chain network using the supply chain simulation model as modified in accordance with the first operational parameter, wherein simulating execution of the set of predicted digital orders includes: retrieving historical order information and demand guidance from an external data store; connecting to one or more live data feeds supplying live supply chain network data; based on at least the live supply chain network data, using the supply chain simulation model and the default value for the first operational parameter to generate a baseline scenario of transaction-level operation of the retail supply chain network; and based on the historical order information and demand guidance, performing one or more additional simulations executing the set of predicted digital orders using the supply chain simulation model and the experimental value for the first operational parameter to generate one or more modified scenarios of transaction-level operation of the retail supply chain network. The example method further includes, for the baseline scenario and each of the one or more simulations executing the set of predicted digital orders, aggregating transaction level data along a first vector for a plurality of predicted metrics associated with each of a cost, a capacity, and a guest experience for the digital order fulfillment process to generate a scenario evaluation; comparing the scenario evaluation for each of the one or more simulations executing the set of predicted digital orders with the scenario evaluation for the baseline scenario by determining a difference in predicted metrics between the baseline scenario and each of the one or more simulations executing the set of predicted digital order; and displaying, on a user interface, results based on comparing the scenario evaluations, wherein the results are displayed in one or more of a graphical and tabular format.

In a second aspect, example systems for simulating a plurality of digital orders within a supply chain network are described. An example system includes a computing system including a data store, a processor, and a memory communicatively coupled to the processor, the memory storing instructions executable by the processor to: receive a selection of a first operational parameter of a supply chain simulation model, the supply chain simulation model being a transaction-level model representative of a digital order fulfillment process within a retail supply chain network, the selection of the first operational parameter including a default value for the first operational parameter and an experimental value for the first operational parameter that is different from the default value; simulate execution of a set of predicted digital orders within the retail supply chain network using the supply chain simulation model as modified in accordance with the first operational parameter, wherein simulating execution of the set of predicted digital orders includes: retrieve historical order information and demand guidance from an external data store; connect to one or more live data feeds supplying live supply chain network data; based on at least the live supply chain network data, use the experimental model and the default value for the first operational parameter to generate a baseline scenario of transaction-level operation of the retail supply chain network; and based on the historical order information and demand guidance, perform one or more additional simulations executing the set of predicted digital orders using the experimental model and the experimental value for the first operational parameter to generate one or more modified scenarios of transaction-level operation of the retail supply chain network; for the baseline scenario and each of the one or more simulations executing the set of predicted digital orders, aggregate transaction level data for a plurality of predicted metrics associated with each of a cost, a capacity, and a guest experience for the digital order fulfillment process to generate a scenario evaluation; compare the scenario evaluation for each of the one or more simulations executing the set of predicted digital orders with the scenario evaluation for the baseline scenario by determining a difference in predicted metrics between the baseline scenario and each of the one or more simulations executing the set of predicted digital order; and display, on a user interface, results based on comparing the scenario evaluations, wherein the results are displayed in one or more of a graphical and tabular format.

In a third aspect, example methods for simulating fulfillment of digital orders within a retail supply chain network are described. An example method includes receiving a selection of a first operational parameter of a supply chain simulation model, the supply chain simulation model being a transaction-level model representative of a digital order fulfillment process within a retail supply chain network, the selection of the first operational parameter including a default value for the first operational parameter and an experimental value for the first operational parameter that is different from the default value; simulating execution of a set of predicted digital orders within the retail supply chain network using the supply chain simulation model as modified in accordance with the first operational parameter, wherein simulating execution of the set of predicted digital orders includes: receive at an order simulation engine one or more previous orders and demand guidance indicative of future orders received within the retail supply chain network; receive at a promise engine, a plurality of simulated orders from the order simulation engine, the promise engine defining a service level based on a simulated availability of items within the retail supply chain network; model a fill rate representative of item location information at each of a plurality of nodes within the retail supply chain network; model capacity for items at each of the plurality of nodes within the retail supply chain network based on a known node capacity; select a node from the plurality of nodes within the retail supply chain for simulated fulfillment of each of the plurality of simulated orders based on a defined service level for each of the plurality of simulated orders provided from the promise engine, in combination with the modeled fill rate and modeled capacity at each node; and simulate a carrier allocation for fulfilling each of the plurality of simulated orders from each of the assigned, simulated nodes based at least in part on serviceability of the respective simulated order, the serviceability being based on at least a carrier rate and a carrier assignment for the respective simulated order, wherein the first operational parameter is one of service level, item node location information, node capacity, carrier rate, and carrier assignment and simulating execution of the set of predicted digital orders includes using the default value for the first operational parameter to simulate a baseline scenario and using the experimental value for the first operational parameter to generate one or more modified scenarios. The example method further includes aggregating transaction level data from each of the plurality of simulated orders in the set of predicted digital orders for a plurality of predicted metrics associated with each of a cost, a capacity, and a guest experience for the digital order fulfillment process to generate a scenario evaluation for the baseline scenario and the one or more modified scenarios; comparing the scenario evaluation for each of the one or more modified scenarios with the scenario evaluation for the baseline scenario by determining a difference in predicted metrics; and displaying, on a user interface, results based on comparing the scenario evaluations, wherein the results are displayed in one or more of a graphical and tabular format.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 12 illustrates an example user interface displaying an output from a node throughput capacity module FIG. 13 illustrates an example user interface displaying an output from the digital order simulation system.

DETAILED DESCRIPTION

Figure 1:
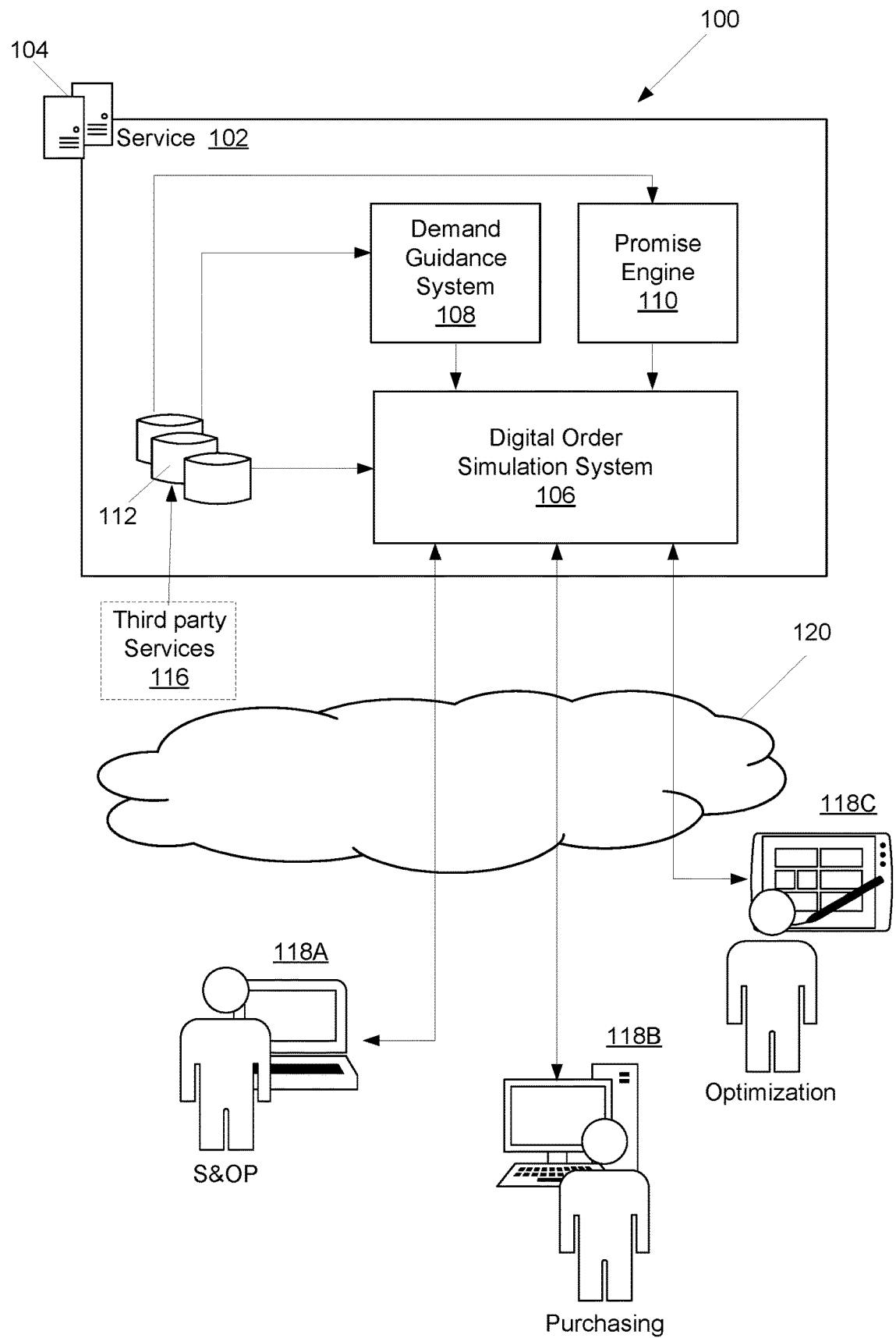
FIG. 1 illustrates an example network environment where a system to simulate fulfillment of digital orders may be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

As briefly described above, embodiments of the present invention are directed to a digital order simulation tool that may be integrated with a supply chain network of a retail enterprise. In particular aspects, the digital order simulation tool allows a retailer to simulate fulfillment of a set of predicted digital orders, which may include known past orders or predicted future orders. The digital order simulation tool includes a supply chain simulation model configured to simulate the execution of the set of predicted digital orders on a transaction-level basis. The supply chain simulation model may include a plurality of operational parameters, where operational parameters are factors or variables within the dynamic digital order fulfillment process, which may include, but are not limited to, node of origin, carrier, box size, carrier rate, and shipping cost. The operational parameters may affect the outcome of digital order fulfillment in terms of cost, capacity, and guest experience. Thus, understanding the effect of a specific operational parameter on the fulfillment of digital orders is useful for planning the complex orchestration of digital order fulfillment in a large retail supply chain network.

To account for the complexity of a supply chain network when simulating fulfillment of predicted digital orders, a plurality of simulations may be performed by the supply chain simulation model simulating the execution of a set of predicted digital orders to study the effect of an operational parameter on the fulfillment of predicted digital orders. The supply chain simulation model may receive as input a selection of an operational parameter, where the selection also includes a default value for the operational parameter and at least one experimental value for the operational parameter. The supply chain simulation model may then perform transaction-level simulations for each digital order in the set of predicted digital orders using the default value to generate a baseline scenario and using experimental values to generate modified scenarios. The transaction level data from the simulations may then be aggregated to generate scenario evaluations for the baseline scenario and the modified scenarios. The scenario evaluations for the modified scenarios may be compared to the scenario evaluation for the baseline scenario. Results based on the comparison and analysis of scenario evaluations may be displayed on a user interface. The results may be used for decision making relating to digital order fulfillment within the retail supply chain network.

FIG. 1 illustrates an example network environment 100 where a system 106 to simulate fulfillment of digital orders within a retail supply chain network may be implemented, referred to hereafter as the digital order simulation system 106. The digital order simulation system may be hosted by a service 102. In some examples, the service 102 may also host a demand guidance system 108 and a promise engine 110. One or more servers or processors 104 may be operable to execute one or more components of the service 102, including the digital order simulation system 106, the demand guidance system 108, and the promise engine 110. In other examples, one or both of the demand guidance system 108 and the promise engine 110 are hosted externally by third party services 116.

In some examples, the service 102 may be associated with an enterprise, such as a retail enterprise that offers goods and/or services, also referred to herein as items, directly to consumers. In addition to online channels, the enterprise may have a plurality of physical stores through which items are sold. Additionally, the enterprise may have or be associated with one or more distribution centers that store the items until they are needed at one or more of the stores, or delivered directly to consumers via online sales channels. The distribution centers and stores may comprise nodes of a supply chain network for the enterprise.

The digital order simulation system 106 may perform the simulation on a transaction level per-item basis. As input, the digital order simulation system 106 may receive at least supply chain domain logic, historical order information, demand guidance predicted by the demand guidance system 108, and promise policy information generated by the promise engine 110. Promise policy information may include, but is not limited to, defined service levels within the retail supply chain network, which may be based on a simulated availability of items. As described in more detail with reference to FIGS. 2-6 below, the digital order simulation system 106 may process inputs to generate and define values for a plurality of operational parameters of the supply chain simulation model. The supply chain simulation model may then simulate the execution of a set of predicted digital orders using defined values for the operational parameters.

In some examples, one or more of the inputs received by the digital order simulation system 106 may be generated internally by the service 102 and subsequently stored in the data stores 112. As described in greater detail with reference to FIG. 3, at least some of the supply chain domain logic received as input may include network inputs, product inputs, node inputs, arc inputs, and operation perturbations, among other example inputs. Some portions of the supply chain domain logic in addition to other data may be used by the demand guidance system 108 to predict demand for each item and by the promise engine 110 to generate one or more promise policies to define a service level for use in simulations. In some examples, each type of data may be stored in separate data stores 112. In other examples, the various types of data may be combined in one or more of the data stores 112.

In one embodiment, the service 102 may interoperate with various applications to enable users affiliated with the enterprise to submit requested metrics to and subsequently receive corresponding values for the metrics (e.g., the output from the digital order simulation system 106) over a network 120. For example, the users may execute a thin version of an application (e.g., a web browser) or a thick version of the application (e.g., a locally installed application) through devices 118A, 118B, and 118C, collectively devices 118. The devices 118 may include a desktop computer, a laptop computer, a tablet computer, a smart phone, or wearable computing device, among other similar devices. An application programming interface (API) may facilitate communication between the service 102 and the devices 118 and/or the simulation system 106 and the devices 118 over one or more networks, such as the network 120.

In some examples, the users may be affiliated with different aspects of the enterprise supply chain management, such as sales and operations planning (S&OP), purchasing, and optimization. One or more of S&OP, purchasing, and optimization may utilize certain types of the output (e.g., values of certain metrics) as input for subsequent processes. Therefore, the types of metrics requested may be based on which aspect of the enterprise supply chain management the user is affiliated with.

Figure 2:
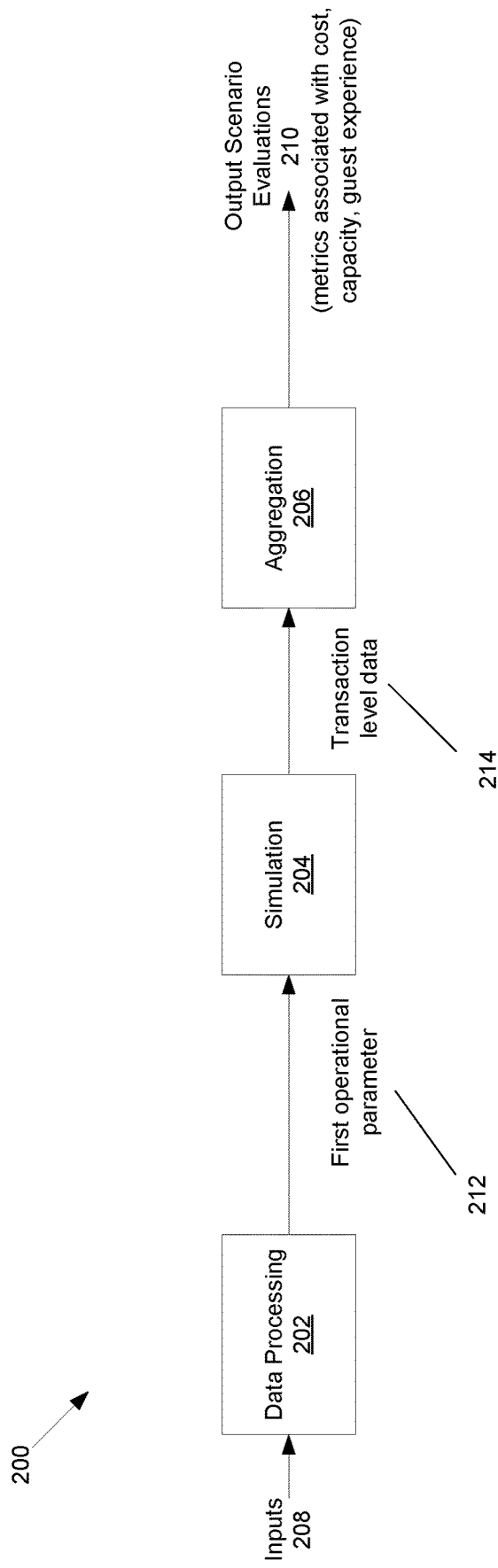
FIG. 2 is a conceptual diagram illustrating example processes of the digital order simulation system.

FIG. 2 is a conceptual diagram illustrating example processes 200 of the digital order simulation system 106. Example processes performed by the digital order simulation system 106 may include at least data processing 202, simulation 204, and aggregation 206. The digital order simulation system 106 may perform these processes on a transaction level per-item basis for an enterprise supply chain network.

As described in greater detail with reference to FIG. 3, during the data processing 202, inputs 208 may be received and processed to determine values for operational parameters of the supply chain simulation mode. Additionally, during the data processing 202, the set of predicted digital orders to simulate fulfillment of may be defined. For example, the set of predicted digital orders may include a set of known past digital orders, or may include a defined set of uncertain predicted future orders based on historical order information and demand guidance.

As described in greater detail with reference to FIG. 4, defined values for the operational parameters, including the first operational parameter, may be applied to the supply chain simulation model during the simulation 204 to yield transaction level data for a set of predicted digital orders. In examples, a plurality of simulations will be performed to simulate execution of each discrete order within the set of predicted digital orders. In these examples, in each of the plurality of simulations, the supply chain simulation model is modified in accordance with the first operational parameter, such that one set of simulations are run using the default value for the first operational parameter, another set of simulations are run using a first experimental value for the first operational parameter, and yet another set of simulations are run using a second experimental value for the first operational parameter. Each set of simulations executes the fulfillment of the set of predicted digital orders. The output from each simulation is transaction level data 214 for each discrete order in the set of predicted digital orders. In some examples, each set of simulations executing the set of predicted digital orders using an experimental value for the first operational parameter may be a series of monte carlo simulation using a randomly selected value for the experimental value for the first operational parameter.

As described in greater detail with reference to FIG. 5, the transaction level data 214 yielded from the simulation 204 may be transformed to generate scenario evaluations during the aggregation 206. The scenario evaluations may include predicted metrics associated with a cost, a capacity, and a guest experience for the digital order fulfillment process. The scenario evaluations including predicted metrics may be provided as output 210 of the digital order simulation. In some examples, additional reporting or post-processing logic may be applied to the predicted metrics. Additionally or alternatively, the predicted metrics from the scenario evaluations may be used as inputs in another subsequent process or simulation.

Figure 3:
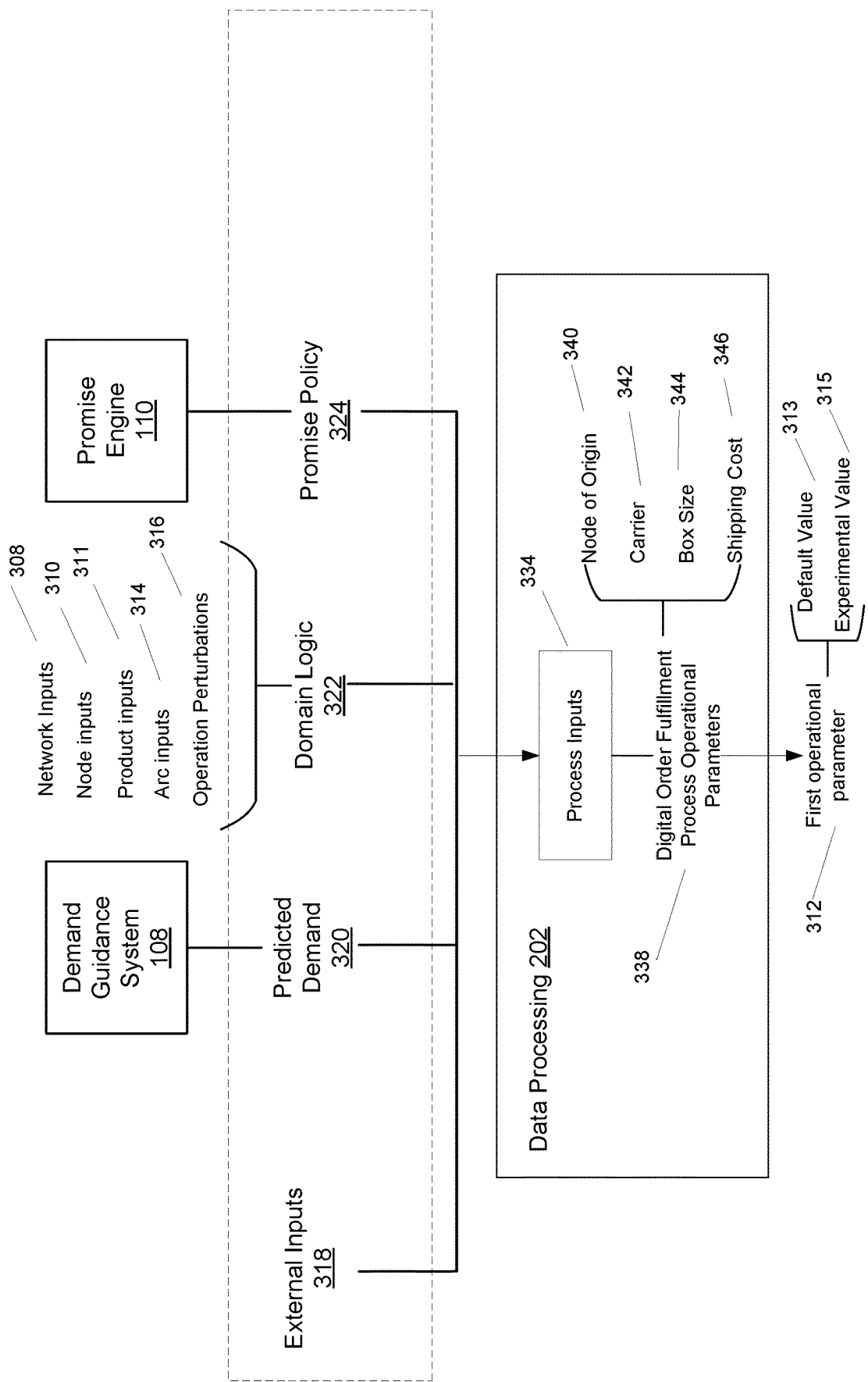
FIG. 3 illustrates example data processing performed by the digital order simulation system.

FIG. 3 illustrates an example of the data processing 202 performed by the digital simulation system 106. The digital order simulation system 106 may receive a plurality of inputs. Example inputs 206 may include external inputs 318, predicted demand 320 for each item, domain logic 322 associated with the supply chain network, and a promise policy 324. A promise policy 324 may include a defined service level for fulfillment of predicted digital orders as determined by the promise engine 110.

The external inputs 318 may include historical order information, such as order information from the previous twelve months, and carrier information, such as carrier rates and carrier availability, among other examples. The predicted demand 320 for items may be determined by the demand guidance system 108. Demand is a quantity of the item that consumers are willing and able to purchase at various prices during a given period of time. A retailer wants to have enough units of the item at the store to satisfy consumer demands. Ordering too many units increases holding costs and increases the risk of losses due to spoilage or items being outdated or undesirable to consumers. Ordering too few units increases the risk of lost sales and unsatisfied consumers. Thus, when a store sends a transfer order to a distribution center to replenish units of the item at the store, for example, the store may utilize the demand guidance system 108 to predict demand so that an appropriate number of units are ordered.

Processes that are not fully understood, and whose outcomes cannot be precisely predicted, are often called uncertain or non-deterministic. Additionally, processes that have a range of possible values and have some variation may be referred to as stochastic. Demand is one example. Models explicitly recognizing the stochastic nature of demand may be implemented by the demand forecasting system 108 in order to more accurately predict demand. For example, the predicted demand 320 may be provided as a probability distribution of demand for an item on a given epoch (e.g., a number of items predicted to be purchased on a given day). The day may be defined based on store hours during which purchases can be made, such as from open to close of the store. The demand guidance system 108 may utilize a variety of data to determine the predicted demand 320. Non-limiting and non-exclusive examples include one or more of items sales data (e.g., a number of units of the item sold), price data (e.g., a number of units of the item sold at a particular price, and inventory data (e.g., a number of remaining units of the item), among other similar data.

The domain logic 322 may include network inputs 308, node inputs 310, product inputs 311, arc inputs 314, and operation perturbations 316. Example network inputs 308 may include types and locations of nodes and valid edges or arcs between the nodes. A node may be a supplier, a distribution center or a store, among other facilities in the supply chain network, and an edge or an arc may connect two nodes in a direction of the product flow to show a route for transporting the product between the two nodes. Example node inputs 310 may include a throughput capacity (in units) of a node, a storage area capacity by unit type (e.g., pallets, casepacks, eaches), a processing cost per unit, a processing lead time (e.g., a time from start to end of processing), an ordering schedule for supply nodes, and initial inventory.

Example product inputs 311 may include dimensions or volume of an individual unit (e.g., an each) of the product or item, a number of eaches per case, dimensions or volume of a casepack, a number of cases per pallet, and special attributes of the product. The special attributes of the product or item may describe a category of the product (e.g., apparel) or properties associated with the product or its packaging (e.g., nonconveyable, flammable, or perishable). Example arc inputs 314 may include dimensions or volume of a load, a transportation cost per load, and a transportation lead time (e.g., a time from start to end of transport).

Example operation perturbations 316 may include disruptions to a normal operation of the supply chain, such as lead time. Lead time may be present at various stages of the supply chain, including item processing at the distribution center, transportation from a distribution center to a store, and/or item processing at the store. Similar to demand, lead time may be uncertain or stochastic. Therefore, a model explicitly recognizing the stochastic nature of lead time may be implemented in order to more accurately predict lead-time related operation perturbations 316 for provision as one of the inputs. For example, a nominal value with an error model may be determined or a nominal value and an actual value may be determined.

A promise policy 324 may be generated by the promise engine 110 configured to mimic a promise from a retail enterprise regarding serviceability and item availability. The promise policy 324 may be generated based on defined services levels and policies set by the retail enterprise. A promise policy 326 may define a service level based on a simulated availability of items with the retail supply chain network. Here, the promise policies 326 may be associated with fulfillment of predicted digital orders.

During the data processing 202, processing inputs 334 may be performed by the digital order simulation system 106. At operation 334, the inputs 208, including the external inputs 318, the predicted demand 320, the domain logic 322, and the promise policy 324 may be processed to generate values for a plurality of operational parameters within a supply chain simulation model. Example operational parameters 338 may include node of origin, carrier identification 342, box size 334, and shipping cost 346. One of ordinary skill in the art will recognize that there may be additional operational parameters associated with the supply chain simulation mode.

Based on the data processing 202 and further based on receiving a selection of a first operational parameter, a first operational parameter 312 is selected along with a default value 313 for the first operation parameter and at least one experimental value 315 for the first operational parameter that is different from the default value. The default value 313 and experimental values 315 are used to generate scenarios of transaction-level operation of the retail supply chain network, as described in greater detail with reference to FIG. 4.

Figure 4:
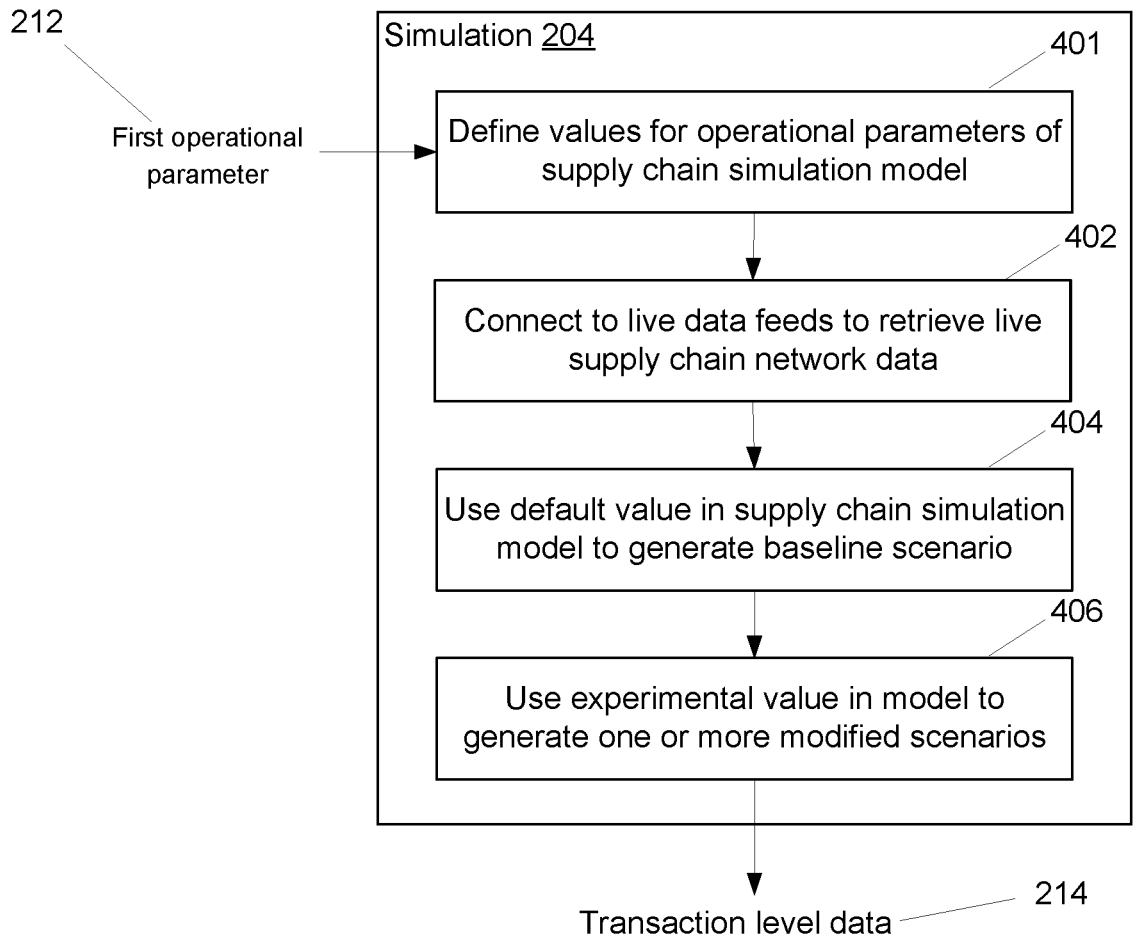
FIG. 4 illustrates an example simulation process performed by the digital order simulation system.

FIG. 4 illustrates an example of the simulation process 204 performed by the digital order simulation system 106. For example, operations 401, 402, 404, and 406 may be performed by the digital order simulation system 106 to yield transaction level data 210. At operation 401, values for operational parameters of the supply chain simulation model are defined. For example, based on inputs such as historical order information from external data stores and predicted demand, values for the operational parameters may be defined. At operation 402, live supply chain network data may be retrieved by connecting to live data feeds. Connecting to live data feeds ensures that the most up-to-date data for the retail supply chain network is used in the simulation 204. By using live supply chain network data in the simulation process 204, the output of predicted metrics more accurately reflects the current run-state of the supply chain for the retail enterprise network.

In response to retrieving live supply chain network data and the default value for the first operational parameter 212, the supply chain simulation model uses the default value for the first operational parameter 212 to generate a baseline scenario at operation 404. In examples, the baseline scenario is dynamic and may be updated as live supply chain network data changes. In response to retrieving historical order information, predicted demand, and at least one experimental value for the first operational parameter 212, the supply chain simulation model uses the experimental value for the first operation parameter 212 to generate at least one modified scenario at operation 406. A modified scenario may be generated for each of the one or more experimental values for the first operation parameter. In each modified scenario, the value for the first operational parameter may change in accordance with the defined experimental value, but other operational parameters may stay constant.

During the simulation 204, fulfillment of a set of predicted digital orders is simulated on a transaction level for each discrete order within the set of predicted digital orders. Thus, simulating the execution of the set of predicted digital orders includes simulating fulfillment of each discrete order using the supply chain simulation model as modified in accordance with the first operational parameter. For each use case, the same set of predicted digital orders is run through the supply chain simulation model for each of the baseline scenario and one or more modified scenarios, where each scenario is generated using different value for the first operational parameter. The result of each simulation is transaction level data 210 associated with the fulfillment of each discrete digital order as predicted by the supply chain simulation model as modified in accordance with the first operational parameter for each scenario. The transaction level data 210 may include metrics associated with fulfillment of predicted digital orders, such as a cost, a capacity, and a guest experiment.

Figure 5:
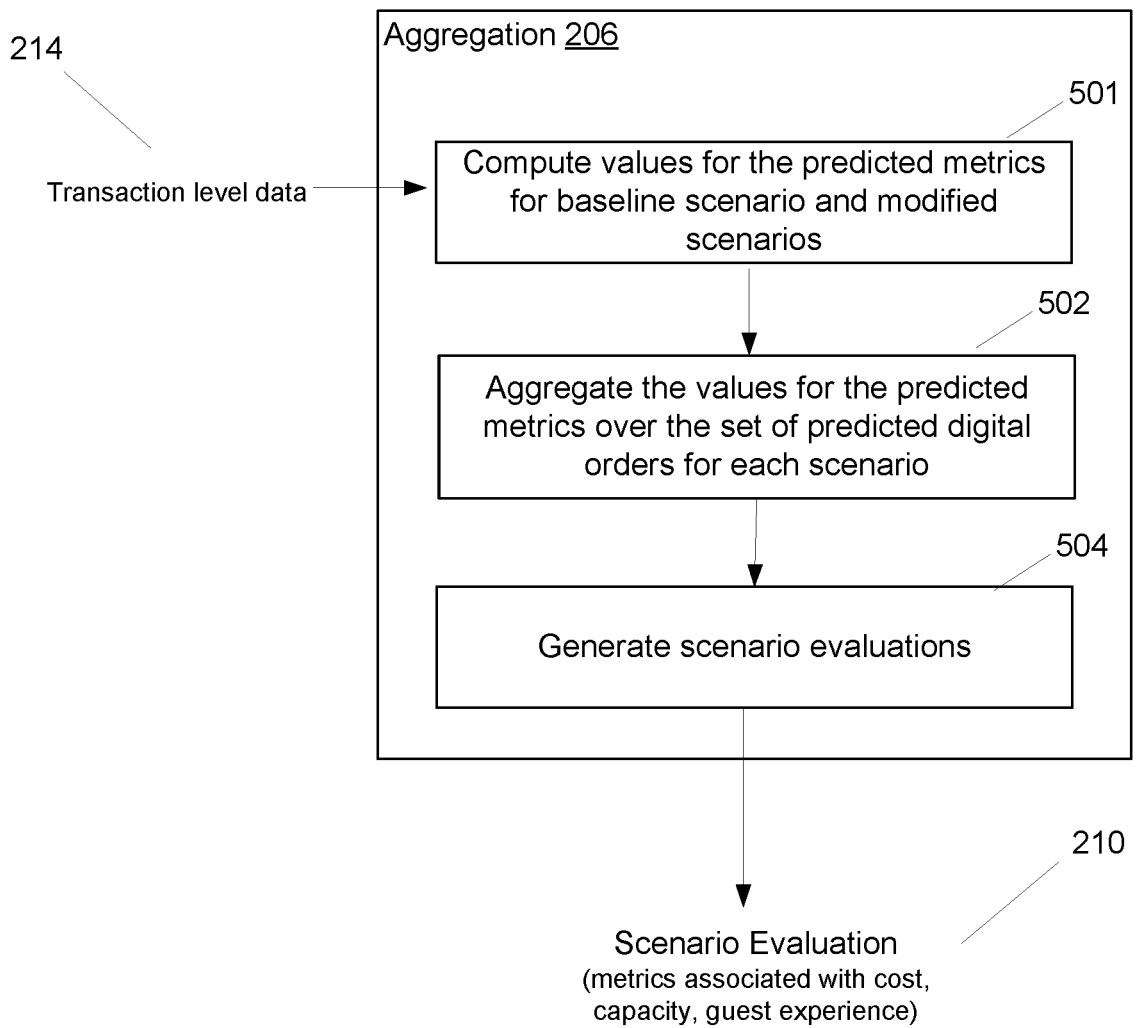
FIG. 5 illustrates an example aggregation process performed by the digital order simulation system.

FIG. 5 illustrates an example of the aggregation process 206 performed by the digital order simulation system, useable after transaction level data 214 is generated from the simulation process 204. For each separate scenario generated using the supply chain network model, the transaction level data 214 for each discrete order in the set of predicted digital orders may be received as input for the aggregation process 206. During the aggregation process 206, operations 501, 502, and 504 may be performed by the digital order simulation system 106 to transform the transaction level data to aggregate values for a plurality of predicted metrics to be included in a scenario evaluation 210 as output.

To transform the transaction level data 214, values for the predicted metrics may be computed for the baseline scenario and for each modified scenario at operation 501. At operation 502, the values for the predicted metrics may be aggregated over the set of predicted digital orders. The aggregation process 206 is performed separately for each scenario generated by the supply chain network model.

At operation 504, a scenario evaluation is generated for each scenario, where each scenario evaluation includes aggregated predicted metrics. The predicted metrics may include data associated with a cost, a capacity, and a guest experience for the digital order fulfillment process. In examples, the aggregation process 206 of transaction level data is performed along a first vector for the predicted metrics. The transaction level data may also be stored prior to aggregation, so that transaction level data may be aggregated along a second vector for the predicted metrics without requiring re-simulation. Aggregating the same transaction level data generated by the simulation 204 along a second vector may generate a second scenario evaluation that is different from the scenario evaluation generated by aggregating the transaction level data long the first vector. This enables another aggregation process to be performed using the same transaction level data without requiring another set of simulations.

In examples, the output scenario evaluations 210 may be further analyzed and used for optimization of the digital order fulfillment process. For example, the scenario evaluation for each modified scenario may be compared with the scenario evaluation for the baseline scenario by determining a difference in the aggregated predicted metrics between the baseline scenario and each of the modified scenarios. By comparing the predicted metrics generated from the baseline scenario and each of the modified scenarios, the effect of changing the value for the first operational parameter may be analyzed and better understood. In examples, results based on comparing the scenario evaluations may be displayed on a user interface. The displayed results are described in greater detail with reference to FIGS. 7-9.

The data processing 202, simulation 204, and aggregation processes as described in detail with reference to FIG. 3, FIG. 4, and FIG. 5, respectively, are performed for each use case to predict values for metrics associated with the digital order fulfillment process for the respective use case with regard to fulfillment of predicted digital orders within a supply chain network using the supply chain simulation model as modified in accordance with a selected operational parameter. In examples, the scenario evaluations may be stored in a memory in association with an experimental value for the first operational parameter. The data processing 202, simulation 204, and aggregation 206 processes may be repeated for a plurality of different use cases with regard to the same set of predicted digital orders, while modifying the value for a second operational parameter that is different from the first operational parameter. By using the same set of predicted digital orders while modifying the supply chain simulation model as modified in accordance with a second operational parameter, the resulting scenario evaluations and predicted metrics may be useful for analyzing how the first and second operational parameters affect fulfillment of the same set of predicted digital orders.

Figure 6:
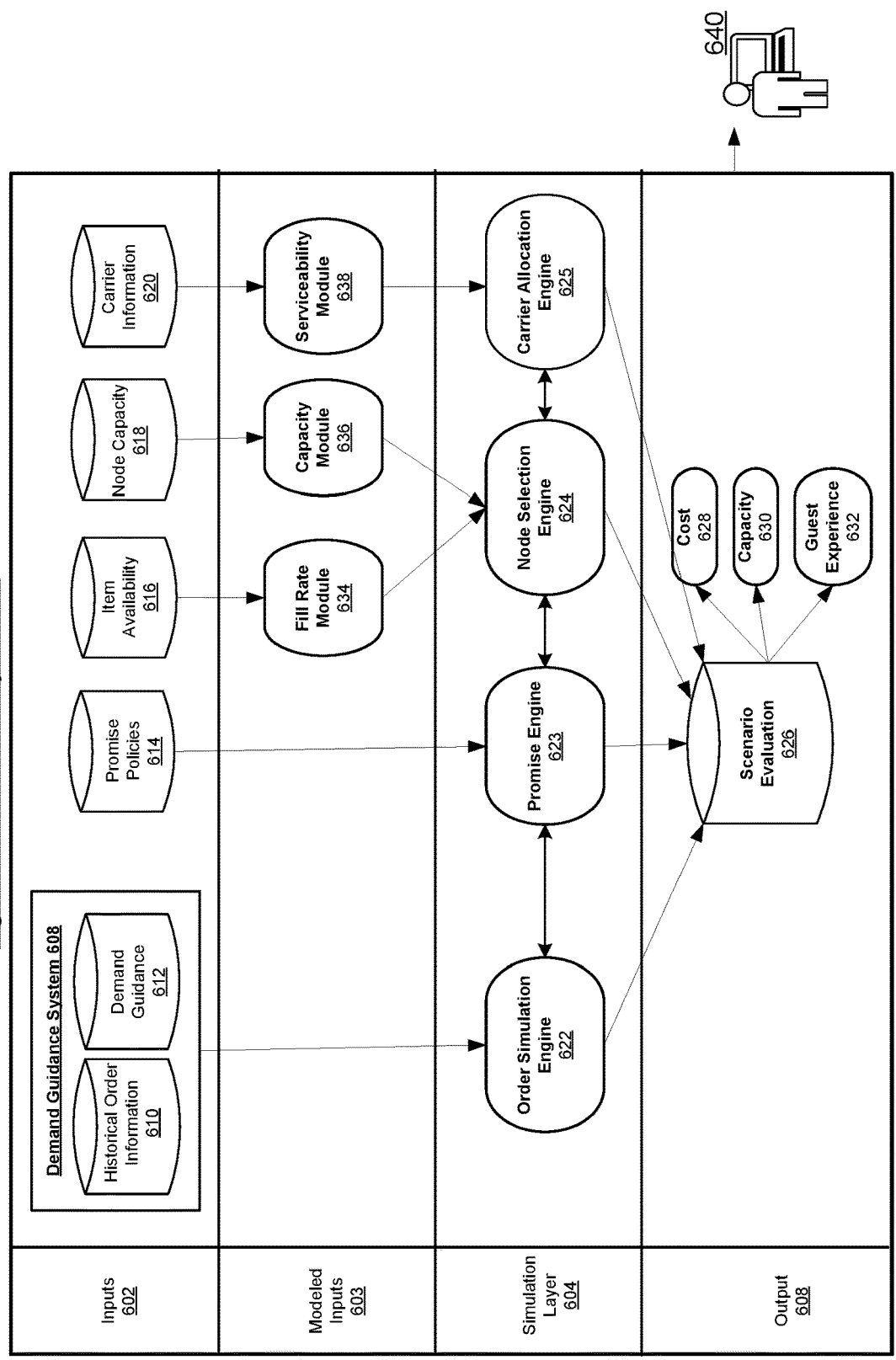
FIG. 6 illustrates a block diagram of an example architecture of the digital order simulation system.

FIG. 6 illustrates a block diagram of an example architecture 600 of the digital order simulation system 106. The digital order simulation system 106 may be configured to receive a plurality of inputs 602 and modeled inputs 603. The inputs 602 and modeled inputs 603 may be provided to a simulation layer 604 of the digital order simulation 106. The digital order simulation system 106 may receive inputs from the demand guidance system 608. The demand guidance system 608 may receive and store historical order information 610 and demand guidance 612. Historical order information 610 may include transaction level order information from historical orders, such as orders made within the previous twelve months. Demand guidance 612 includes a prediction of how item demand within a department will change in a predetermined period of time, and is indicative of future orders received within the retail supply chain network. Demand guidance 612 may predict demand utilizing a variety of data, such as one or more of items sales data (e.g., a number of units of the item sold), price data (e.g., a number of units of the item sold at a particular price, and inventory data (e.g., a number of remaining units of the item), among other similar data.

Promise policies 613 may be additional input 602 received by the digital order simulation system 106. Promise policies 613 include information defining service levels within the retail supply chain network, such as promises relating to serviceability and item availability, which may be based on a simulated availability of items. Another input 602 may be item availability 616 at each node within the supply chain network. Yet another input 602 may be node capacity 618 for each node within the supply chain network, which may be defined by throughput capacity (in units) of a node. Carrier information 620 may also be a received 602, including put not limited to carrier rates, carrier serviceability, and surcharges associated with a carrier for certain services. In addition to the specific inputs 602 discussed (e.g., 610, 612, 614, 616, 618, 620), in some examples, the digital order simulation system 106 may receive modeled inputs 603. For example, based on known item availability 616 and known node capacity 618, a fill rate module 634 may generate a predicted fill rate representative of item location information at each of a plurality of nodes within the supply chain network. A capacity module 636 may generate a predicted capacity for items at each of the plurality of nodes. Additionally, the carrier information 620 may be sent to a serviceability module 638 to predict a service level. The modeled fill rate, modeled capacity, and modeled service level may be provided to the digital order simulation system 106 as modeled inputs 603. Additional details of the fill rate module are shown in FIG. 7.

In examples, the simulation layer 604 of the digital order simulation system 106 may include an order simulation engine 622, a promise engine 623, a node selection engine 624, and a carrier allocation engine 625. Historical order information 610 and demand guidance 612 may be received by the order simulation engine 622 to stratify order sampling to simulate a basket configuration and generate a plurality of predicted or simulated digital orders. The plurality of simulated digital orders generated by the order simulation engine 622 may be sent to the promise engine 623, along with promise policies 614. The promise engine 623 may be configured to define and mimic a promise given by a retailer regarding serviceability or item availability based on a simulated availability of items within the supply chain network. The node selection engine 624 may be configured to simulate selection of a node from a plurality of nodes within the supply chain network for simulated fulfillment of each of the plurality of simulated digital orders generated by the order simulation engine 622 based, at least on part, on the defined service level generated by the promise engine 623. In examples, selection of a node by the node selection engine 624 may be further based on a modeled fill rate and modeled capacity at each node within the supply chain network, which are determined based on known item information and node capacity. The carrier allocation engine 625 may be configured to simulate allocating a carrier for fulfilling each of the plurality of simulated digital orders from each of the simulated assigned nodes determined by the node selection engine 624. The simulation of a carrier allocation by the carrier allocation engine 625 may be based at least in part on serviceability of each simulated digital order as defined by the promise engine 623, the serviceability being based on carrier information 620 such as a carrier rate and a carrier assignment for the respective simulated digital order.

The simulation layer 604 of the digital order simulation system 106 provides an output 608, the output including a plurality of predicted metrics associated with fulfillment of the plurality of simulated digital orders. As discussed in more detail with reference to FIGS. 2-5, the simulation process results in transaction level data for each discrete predicted digital order. The output transaction level data is aggregated, as discussed in detail with reference to FIG. 5. The aggregated data is used to generate a scenario evaluation 626 for each simulation of the set of predicted orders. The scenario evaluation 626 includes aggregated predicted metrics associated with each of a cost 628, a capacity 630, and a guest experience 632. A scenario evaluation 626 may be generated for a baseline scenario and each modified scenario. Scenario evaluations may be sent to a device 640 over a network for further processing and/or use in supply chain network planning. In examples, the scenario evaluations 626 may be displayed on a user interface of a device 640, as discussed in greater detail with reference to FIG. 12.

Figure 7:
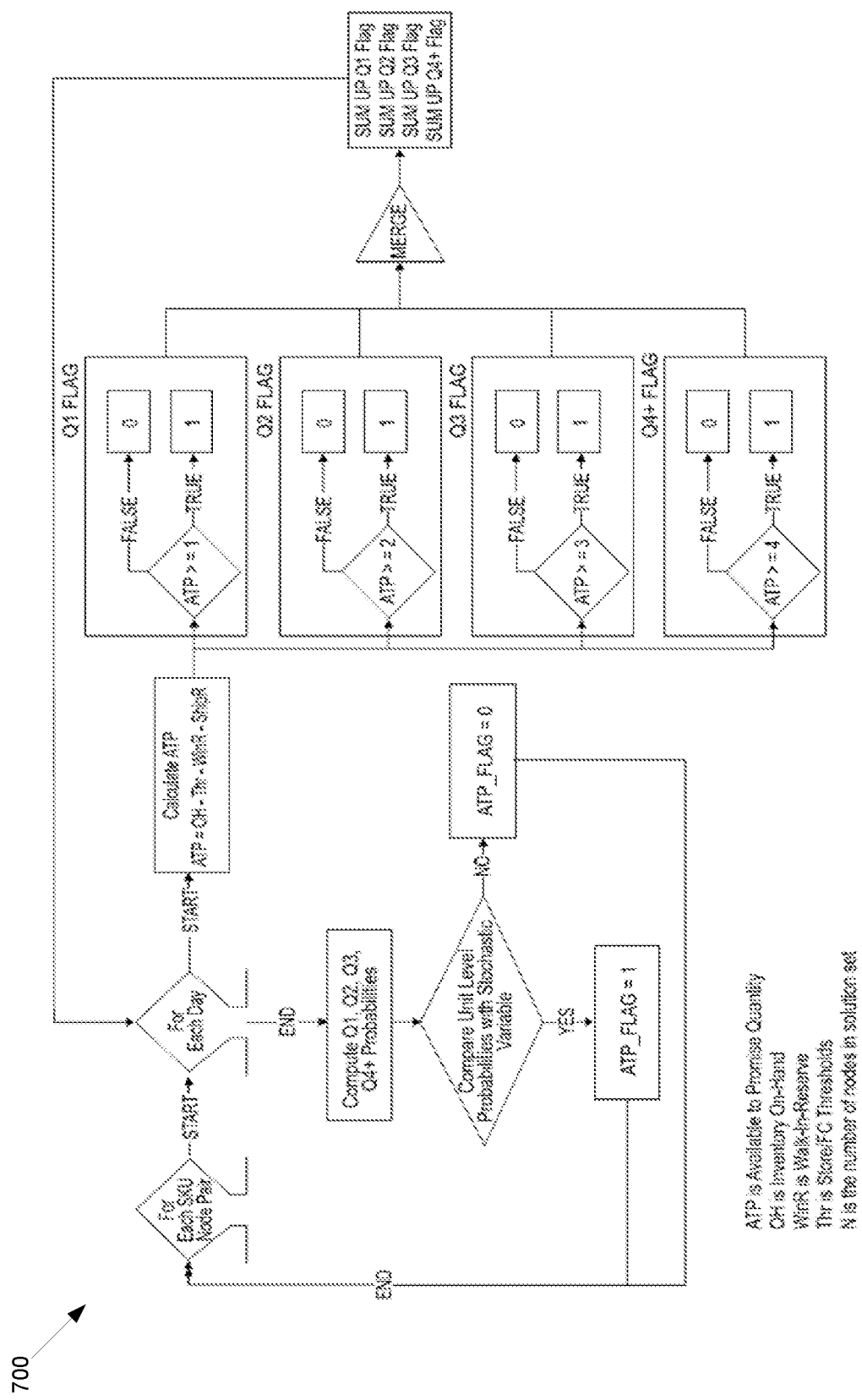
FIG. 7 illustrates a flow diagram depicting the operation of an example fill rate module within the digital order simulation system.

FIG. 7 illustrates a flow diagram 700 depicting the operation of an example fill rate module within the digital order simulation system 106.

Figure 8:
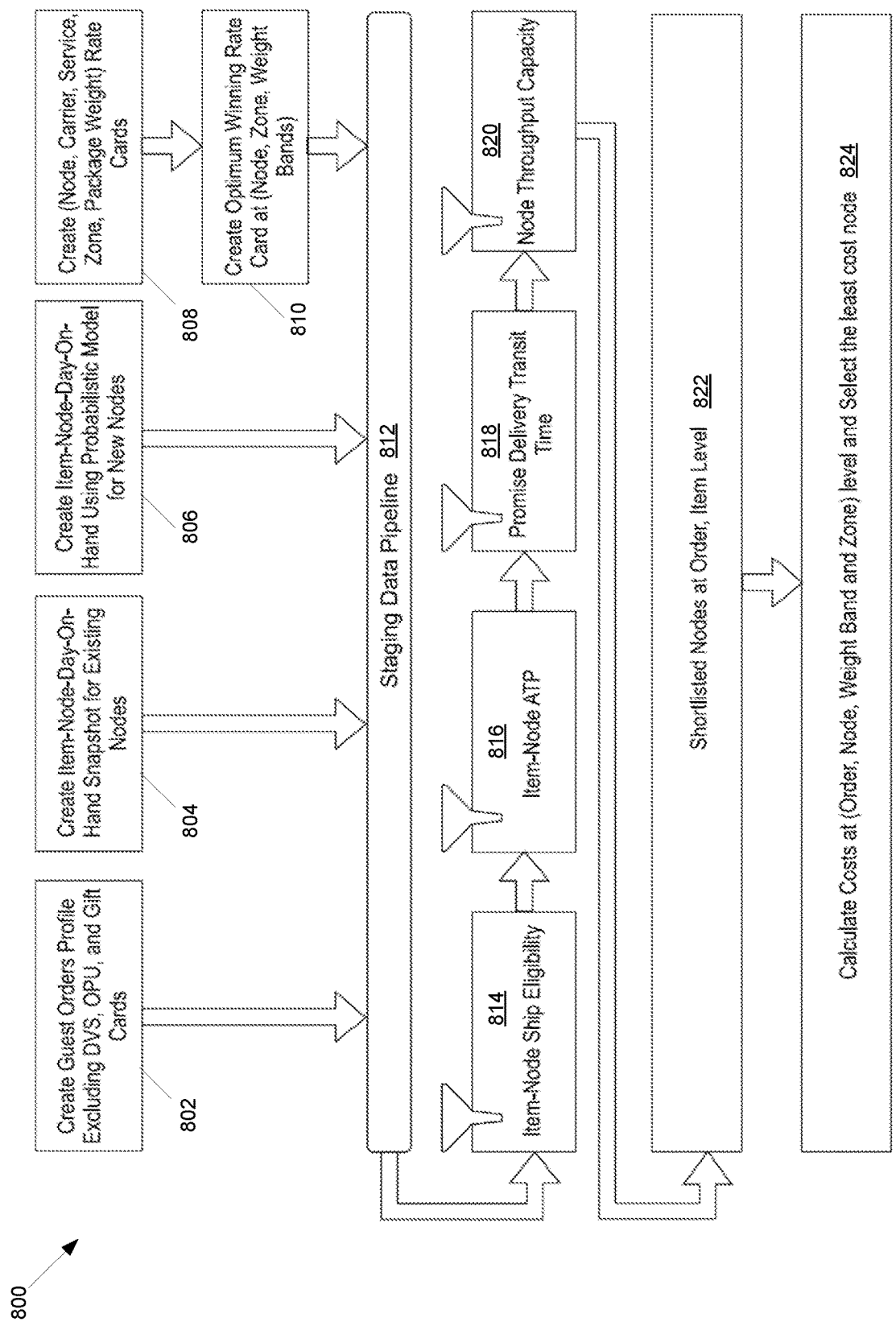
FIG. 8 illustrates a flowchart of an example node selection process within the digital order simulation system.

FIG. 8 illustrates a flowchart of an example node selection process 800 within the digital order simulation system 106. A plurality of inputs 802, 804, 806, 808, 810 may be provided to a staging data pipeline 812. For example, guest order profiles may be created 802, item-node-day-on-hand snapshots may be created for existing nodes 804, item-node-day-on-hand predictions may be created using a probabilistic model for new nodes 806, rate cards 808 may be created 808, and optimum winning rate cards may be created 810. The staging data pipeline 812 may then be used to generate a plurality of simulation inputs 814, 816, 818, 820. For example, the staging data pipeline 812 may be used to identify item-node eligibility 814, item-node available to promise (ATP) 816, promise delivery transit time 818, and node throughout capacity 820. The inputs 814, 816, 818, 820 may further be used to shortlist potential solution nodes 822 based on node eligibility, availability, and capacity, which may be done at the item level. Based on the shortlisted nodes 822, fulfillment costs may be calculated and a least cost node may be selected 824. Additional details of the node selection process are shown in FIG. 9.

Figure 9:
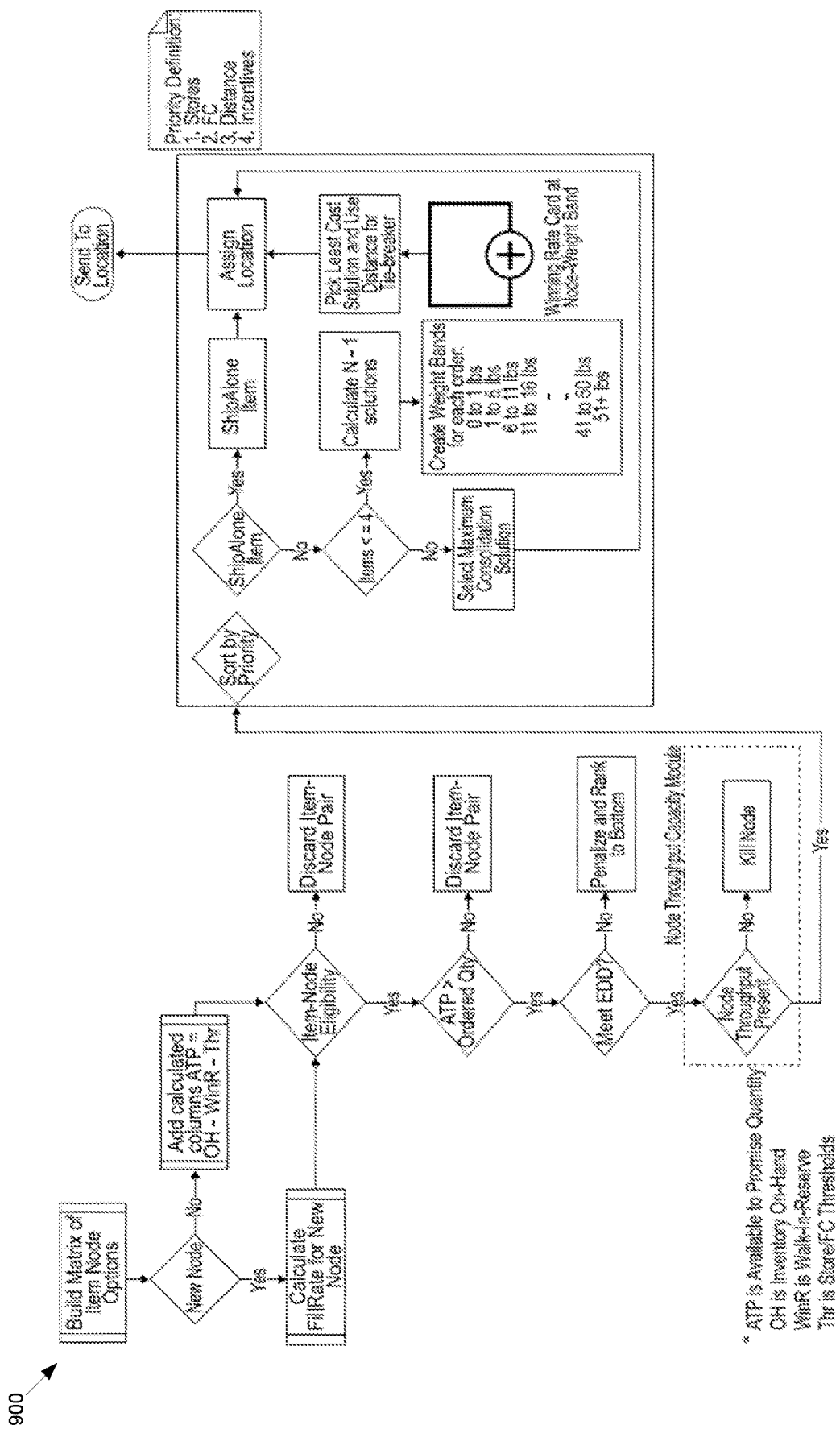
FIG. 9 illustrates a flow diagram depicting the details of the node selection process within the digital order simulation system.

FIG. 9 illustrates a flow diagram 900 depicting the details of the node selection process within the digital order simulation system 106.

Figure 10:
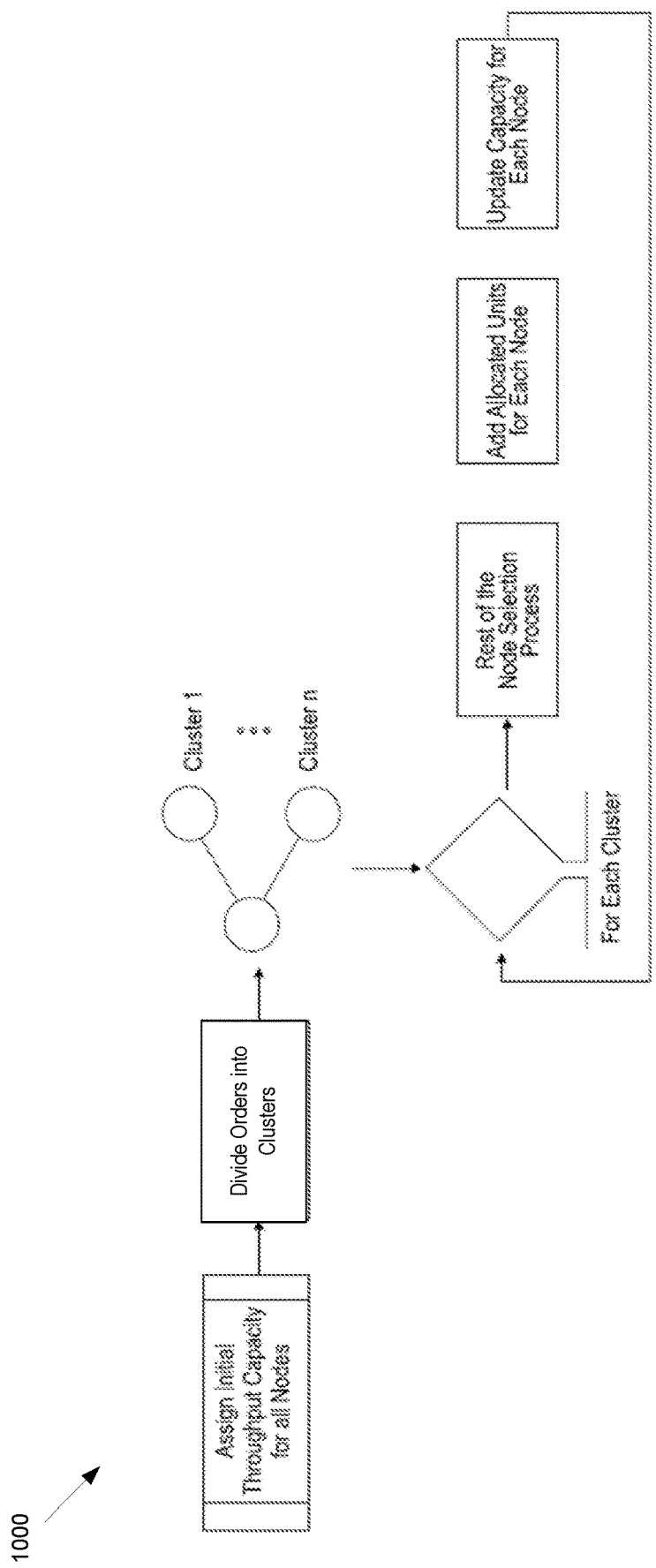
FIG. 10 illustrates a flow diagram depicting the operation of an example node throughput capacity module within the digital order simulation system.

FIG. 10 illustrates a flow diagram 1000 depicting the operation of an example node throughput capacity module within the digital order simulation system 106. The node throughput capacity module 1000 may assign an initial throughout capacity for all nodes. Digital orders may be then divided into clusters. The remainder of the node selection process may then continue for each cluster. Creating clusters of orders may be useful for modeling throughput capacity in a distributed environment.

Figure 11:
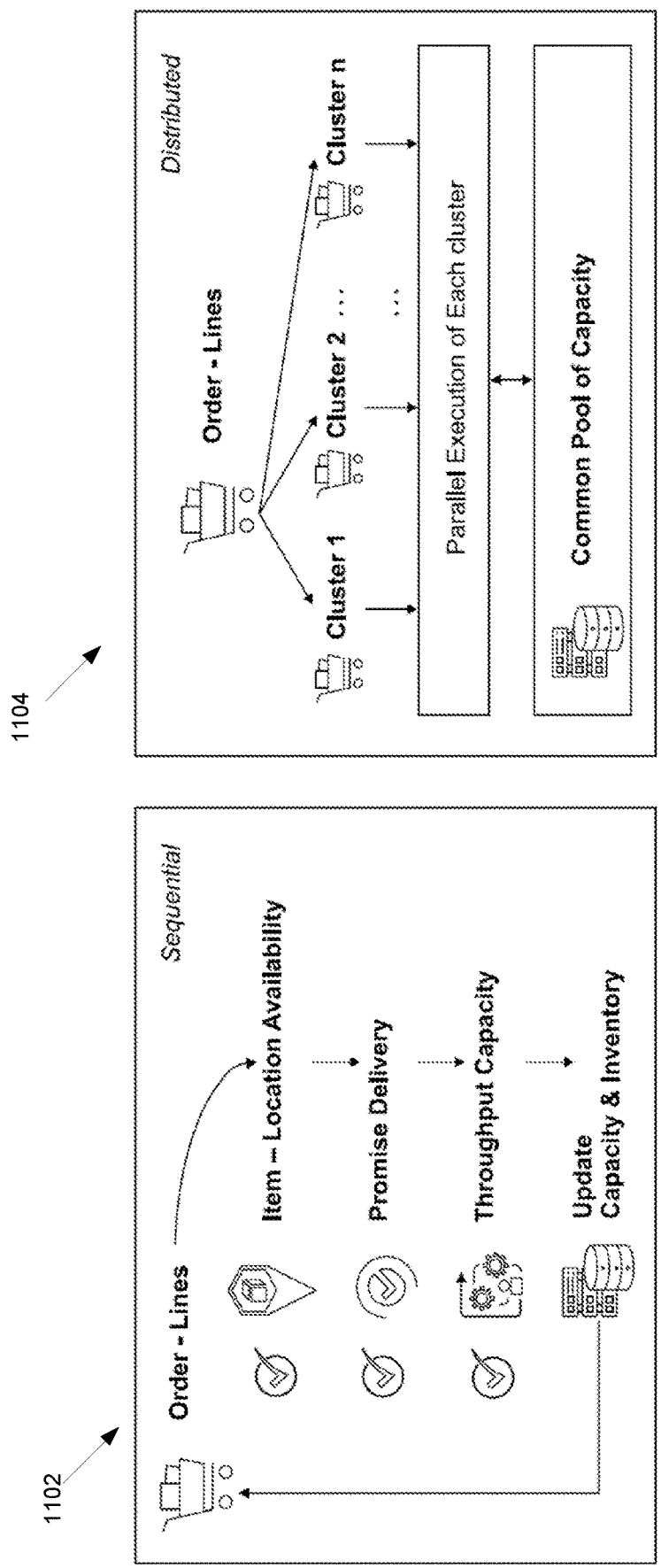
FIG. 11 illustrates the operation of an example node throughput capacity module in a sequential environment and in a distributed environment.

FIG. 11 illustrates the operation of an example node throughput capacity module in a sequential environment 1002 and in a distributed environment 1004. As mentioned above, creating clusters of orders may be used for modeling throughput capacity in a distributed environment. In the distributed environment, after the orders are divided into clusters, the node selection process may be executed in parallel for each cluster. Then a common pool of throughput capacity may be generated. The throughput capacity determined for each order cluster may be displayed on a user interface, for example, as shown in FIG. 12.

FIG. 12 illustrates an example user interface 1204 displaying an output from the node throughput capacity module. The user interface 1204 may be presented on a screen 1202 of a computing device 20. The user interface 1204 may be presented on a display 1206 such as a touch screen display. As described above with respect to FIGS. 10 and 11, clusters of orders based on an hourly distribution of demand may be created. A graphical representation 1202 of the hourly distribution of demand in units may then be displayed. Additional capacity details 1204 for a node or store may also be displayed on the user interface 1200 concurrently with the graphical representation 1202 of hourly distribution of demand.

FIG. 13 illustrates an example user interface 1304 displaying an output from the digital order simulation system 106. As described in detail with reference to FIGS. 2-6, the output from the digital order simulation system 106 is predicted metrics corresponding to fulfillment of predicted digital orders, which may be aggregated from transaction level data. Additional metrics and values not directly output by the aggregation process 206, but computed post-processing may also be displayed on the user interface 1304. The user interface 1304 may display results based on the scenario evaluations in a graphical view and/or a tabular view.

In the example user interface 1304 depicted in FIG. 13, results are displayed in a tabular form. The displayed table 1308 includes a first column identifying problems 1310 associated with fulfillment of predicted digital orders, a second column 1313 identifying scenarios explored 1312, and a third column identifying a recommendation 1314 for solving the associated identified problem. In examples, each identified problem is a different use case and may involve modification of the supply chain simulation model in accordance with a different operational parameter. For example, to study and analyze a supply chain problem associated with carrier diversification, the supply chain simulation model may be modified in accordance with a first operational parameter, wherein the first operational parameter is the number and/or identity of carriers allocated for fulfillment of predicted digital orders. In this example, if two modified scenarios are to be explored, then a first simulation may be run using a default value for the first operational parameter, a second simulation may be run using a first experimental value for the first operational parameter, and a third simulation may be run using a second experimental value for the first operational parameter. The second and third simulations correspond to the two modified scenarios being explored. The results (e.g., scenario evaluations) for the two modified scenarios may then be compared with the results (e.g., scenario evaluation) for the baseline scenario). Based in part on a comparison of the scenario evaluations for the modified scenarios with the scenario evolution for the baseline scenario, at last one recommendation may be generated in the recommendation column 1314. The at least one recommendation may be used by the retail enterprise for supply chain network planning and decision making to optimize fulfillment of digital orders.

Figure 14:
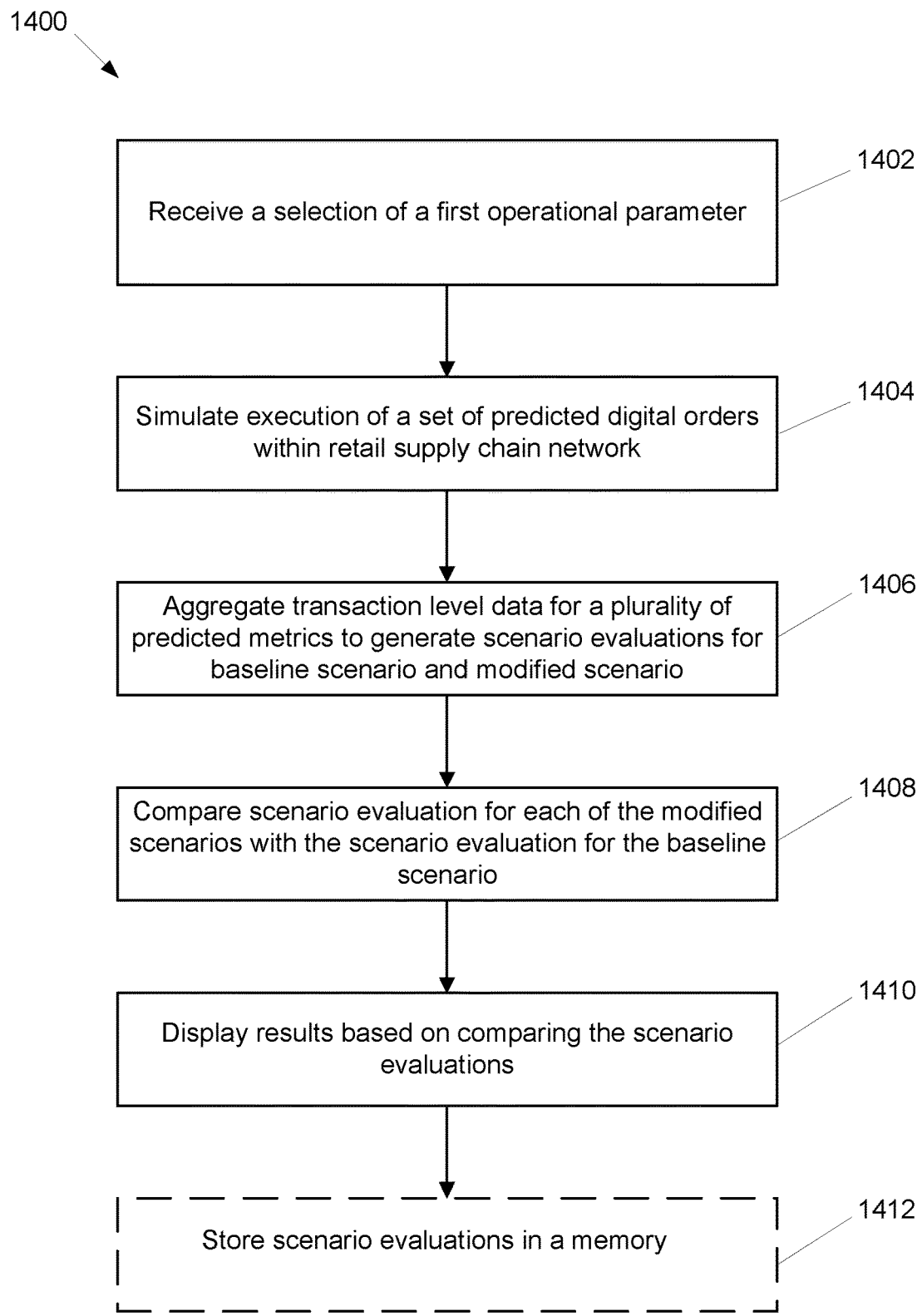
FIG. 14 illustrates a flow diagram of an example method of simulating digital orders.

FIG. 14 illustrates a flow diagram of an example method 1400 of simulating digital orders. In some examples, the method 1400 may be performed by the digital order simulation system 106 described in detail with reference to FIG. 1.

The method 1400 begins at operation 1402, where a selection of a first operational parameter of a supply chain simulation model is received. The supply chain simulation model may be a transaction-level model representative of a digital order fulfillment process within a retail supply chain network. In examples, the first operational parameter may be, but is not limited to, node of origin location, carrier selection, box size, carrier rate, and shipping cost. Receiving a selection of a first operational parameter at operation 1402 may further include receiving a selection of a default value for the first operational parameter and at least one experimental value for the first operational parameter, where the experimental value is different than the default value.

At operation 1404, execution of a set of digital orders within the retail supply chain network may be simulated using the supply chain simulation model as modified in accordance with the first operational parameter. In examples, the simulations performed at operation 1404 include running simulations using the default value for the first operational parameter in the supply chain simulation model to simulate a baseline scenario, and running simulations using the experimental value(s) for the first operational parameter in the supply chain simulation model to simulate at least one modified scenario. Operation 1404 is described in greater detail with reference to FIG. 15. and FIG. 16.

At operation 1406, transaction level data from the simulations performed at operation 1404 is aggregated. The transaction level data includes a plurality of predicted metrics for each discrete order within the set of digital orders. The transaction level data for the plurality of predicted metrics is aggregated at operation 1406 to generate scenario evaluations for the baseline scenario and for modified scenarios. The predicated metrics may be associated with each of a cost, a capacity, and a guest experience for the digital order fulfillment process.

At operation 1408, each scenario evaluation for the modified scenarios may be compared with the scenario evaluation for the baseline scenario. Comparing the scenario evaluation for a modified scenario with the scenario evaluation for the baseline scenario may include calculating a different in predicted metrics between the baseline scenario and the modified scenario.

At operation 1410, results from comparing the scenario evaluation as performed at operation 1008 may be displayed. The results may be displayed on a user interface, for example, as shown in FIG. 12. The results displayed at operation 1410 may be displayed in a graphical and/or tabular format. The results displayed at operation 1410 may include a recommendation for planning or decision making within the retail supply chain network associated with the first operational parameter.

In some examples, at operation 1412, the scenario evaluations may be stored in a memory. The stored scenario evaluations may subsequently be compared to scenario evaluations generated from the supply chain simulation model as modified in accordance with a second operational parameter. For example, scenario evaluations generated from the supply chain simulation model as modified in accordance with the first operational parameter, where the first operational parameter is carrier identification, may be stored at operation 1412. Subsequently, additional scenario evaluations may be generated from the supply chain simulation model as modified in accordance with a second operational parameter, where the second operational parameter is carrier rates at local nodes. The stored scenario evaluations, which explored scenarios modifying carrier identification, may be accessed and compared with the additional scenario evaluations, which explored carrier rates at local nodes. By storing scenario evaluations at operation 1412, a retail enterprise may be able to more easily access predicted metrics associated with a series of simulations executing a set of digital orders for purposes of comparison with predicted metrics associated with subsequent simulations.

Figure 15:
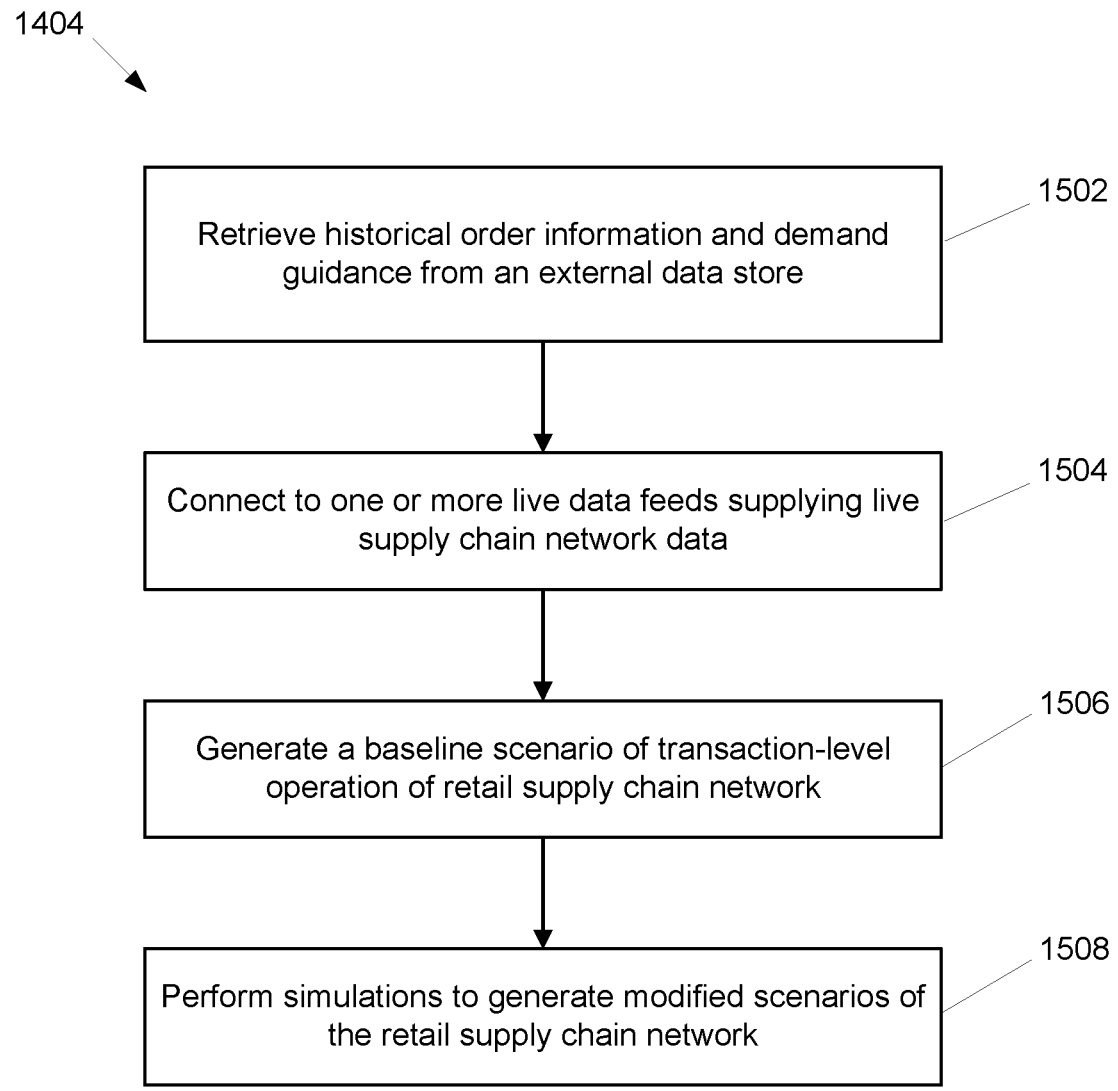
FIG. 15 illustrates a flow diagram of an example method of simulating digital orders.

FIG. 15 illustrates another flow diagram of an example method of simulating digital orders. In some examples, operation 1404 as described with reference to FIG. 14 is performed in accordance with the method illustrated in FIG. 15. The simulation of execution of a set of predicted digital orders, operation 1404, may be performed using the supply chain simulation model as modified in accordance with the first operational parameter.

At operation 1502, historical order information and demand guidance may be retrieved from an external data store. Historical order information may include transaction level order information from historical orders, such as orders made within the previous twelve months. Demand guidance may include a prediction of how item demand within a department will change in a predetermined period of time.

At operation 1504, one or more live data feeds supplying live supply chain network data may be accessed. Live supply chain network data may include live data on aspects of the digital order fulfillment process, such as carrier availability and carrier rates, node capacity and item availability at nodes, and shipping costs. At operation 1506, based on at least the live supply chain network data, and a default value for the first operational parameter, a baseline scenario of transaction-level operation of the retail supply chain network is generated. At operation 1508, based on at least the historical order information and demand guidance retrieved at operation 1502, and an experimental value for the first operational parameter, one or more additional simulations may be performed executing the set of predicted digital orders using the supply chain simulation model to generate one or more modified scenarios of transaction-level operation of the retail supply chain network. Following operation 1508, the transaction level data may be aggregated at operation 1406, as discussed with reference to FIG. 14.

Figure 16:
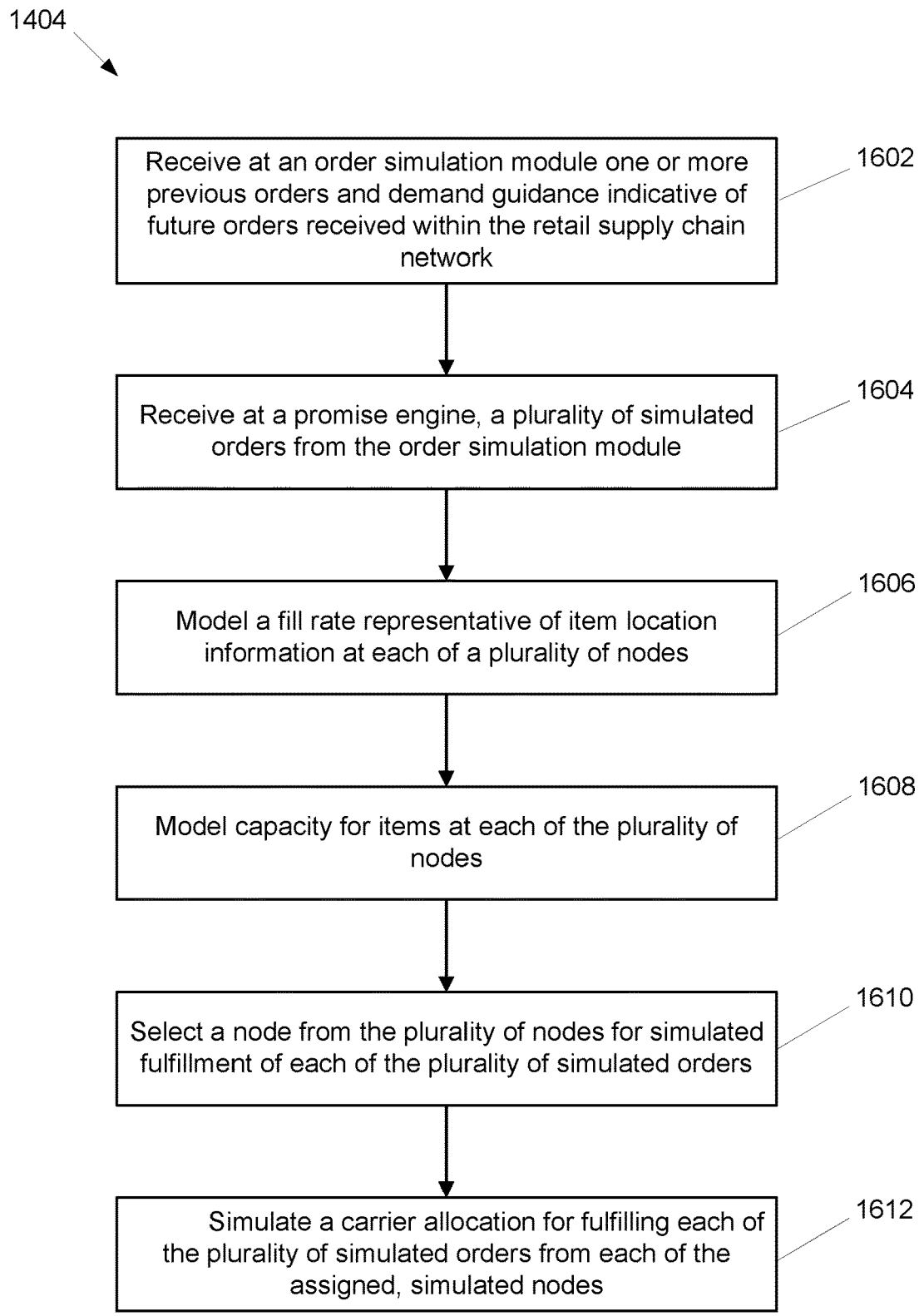
FIG. 16 illustrates a flow diagram of an example method of simulating digital orders.

FIG. 16 illustrates another flow diagram of an example method of simulating digital orders. In some examples, operation 1404 as described with reference to FIG. 14 is performed in accordance with the method illustrated in FIG. 16. The simulation of execution of a set of predicted digital orders, operation 1404, may be performed using the supply chain simulation model as modified in accordance with the first operational parameter. The supply chain simulation model may include an order simulation engine, a promise engine, a node selection engine, and a carrier allocation engine. The order simulation engine, the promise engine, the node selection engine, and the carrier allocation engine are discussed in greater detail with regard to FIG. 6.

At operation 1602, the order simulation module may retrieve historical order information of one or more previous digital orders and demand guidance indicative of future orders received within the retail supply chain network. Operation 1602 may further include generation of a plurality of simulated orders from the order simulation model. At operation 1604, the promise engine may receive the plurality of simulated orders from the order simulation model. The promise engine may also define a service level within the retail supply chain network based on a simulated availability of items within the retail supply chain network. At operation 1606, a fill rate may be modeled, the modeled fill rate being representative of item location information at each of a plurality of nodes within the retail supply chain network. At operation 1608, a capacity for items at each of the plurality of nodes within the retail supply chain network may be modeled based on a known node capacity at each of the plurality of nodes. In examples the modeled fill rate generated at operation 1606 and the modeled capacity generated at operation 1608 are examples of modeled inputs provided to the digital order simulation system.

At operation 1610, a node may be selected from the plurality of nodes within the retail supply chain for simulated fulfillment of each of the plurality of simulated orders. Operation 1610 may be performed by the node selection engine. The simulation of selection of a node at operation 1610 may be based on a defined service level for each of the plurality of simulated orders provided from the promise engine, in combination with the modeled fill rate and modeled capacity at each node. At operation 1612, allocation of a carrier for fulfilling each of the plurality of simulated orders from each of the assigned, simulated nodes is simulated. Operation 1612 may be performed by the carrier allocation engine. The simulation of allocation of a carrier at operation 1612 may be based at least in part on serviceability of the respective simulated order, the serviceability being based on at least a carrier rate and a carrier assignment for the respective simulated order. Following operation 1612, transaction level data may be generated and then subsequently aggregated at operation 1406, as discussed with reference to FIG. 14.

Figure 17:
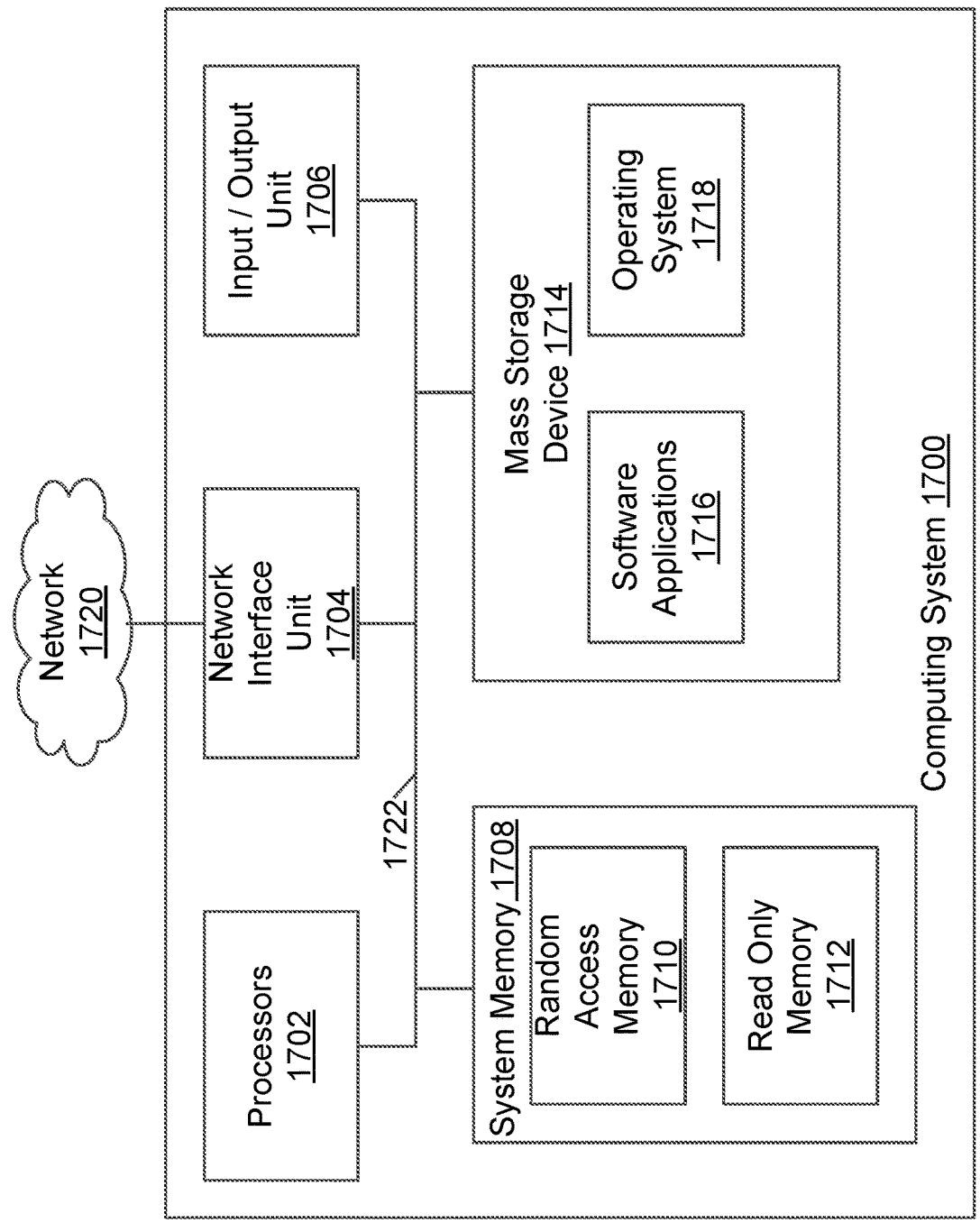
FIG. 17 illustrates a block diagram of an example computing device usable to implement aspects of the present disclosure.

FIG. 17 illustrates an example block diagram of a virtual or physical computing system 1700. One or more aspects of the computing system 1700 can be used to implement the digital order simulation system 106, retail server service 102, or other computing systems described above in conjunction with FIG. 1.

In the embodiment shown, the computing system 1700 includes one or more processors 1702, a system memory 1708, and a system bus 1722 that couples the system memory 1708 to the one or more processors 1702. The system memory 1708 includes RAM (Random Access Memory) 1710 and ROM (Read-Only Memory) 1712. A basic input/output system that contains the basic routines that help to transfer information between elements within the computing system 1700, such as during startup, is stored in the ROM 1712. The computing system 1700 further includes a mass storage device 1714. The mass storage device 1714 is able to store software instructions and data. The one or more processors 1702 can be one or more central processing units or other processors.

The mass storage device 1714 is connected to the one or more processors 1702 through a mass storage controller (not shown) connected to the system bus 1722. The mass storage device 1714 and its associated computer-readable data storage media provide non-volatile, non-transitory storage for the computing system 1700. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1700.

According to various embodiments of the invention, the computing system 1700 may operate in a networked environment using logical connections to remote network devices through the network 1720. The network 1720 is a computer network, such as an enterprise intranet and/or the Internet. The network 1720 can include a LAN, a Wide Area Network (WAN), the Internet, wireless transmission mediums, wired transmission mediums, other networks, and combinations thereof. The computing system 1700 may connect to the network 1720 through a network interface unit 1704 connected to the system bus 1722. It should be appreciated that the network interface unit 1704 may also be utilized to connect to other types of networks and remote computing systems. The computing system 1700 also includes an input/output controller 1706 for receiving and processing input from a number of other devices, including a touch user interface display screen, or another type of input device. Similarly, the input/output controller 1706 may provide output to a touch user interface display screen or other type of output device.

As mentioned briefly above, the mass storage device 1714 and the RAM 1710 of the computing system 1700 can store software instructions and data. The software instructions include an operating system 1718 suitable for controlling the operation of the computing system 1700. The mass storage device 1714 and/or the RAM 1710 also store software instructions, that when executed by the one or more processors 1702, cause one or more of the systems, devices, or components described herein to provide functionality described herein. For example, the mass storage device 1714 and/or the RAM 1710 can store software instructions that, when executed by the one or more processors 1702, cause the computing system 1700 to receive and execute managing network access control and build system processes.

In accordance with the present disclosure, and as reflected in the embodiments below, the present digital order simulation system has a number of technical advantages over existing systems. In particular, referring to FIGS. 1-17 overall, the digital order simulation system provides an advantageous tool for effectively planning the complex orchestration of a digital order fulfillment process, which consists of a plurality of operational parameters that effect the digital order fulfillment process in terms of cost of order fulfillment, capacity, and guest experience. For example, in a large retail supply chain network, where millions of digital orders may be executed per month, there are thousands of nodes for fulfilling orders, and multiple carriers to allocate orders to, there are a plethora of operational parameters within the order fulfillment process that may affect the outcome of order fulfillment. By incorporating both machine learning and optimization techniques, the digital order simulation system can more effectively simulate the orchestration of fulfillment of digital orders while altering values associated with certain operational parameters to lay out the effect of such operational parameters on the overall order fulfillment process. The combination of machine learning and optimization in the digital order simulation system leads to end results that include more accurate predicted metrics associated with the fulfillment of digital orders in different modified scenarios. The resulting predicted metrics from the digital order simulation system have a downstream effect in a broader overall supply chain simulation framework, and may be used by a retail enterprise for decision making relating to expense planning, future topology of the order fulfillment process, last mile carrier strategy, and other order fulfillment planning. Moreover, by performing simulations to generate transaction level data, which may be stored and is later aggregated, the present system is more scalable and efficient than traditional order simulation systems. Furthermore, the simulations at transaction level followed by aggregation allow for more flexible analysis types and allows for multiple different analyses to be performed on a single simulation, since the transaction level data may be aggregated in a wide variety of ways to analyze changes in supply chain behavior in assessed scenarios. Thus, to aggregate transaction level data along multiple vectors, re-simulation is not required, thereby improving execution efficiency and conserving computing resources.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for simulating fulfillment of digital orders within a retail supply chain network, the method comprising:
    receiving a selection of a first operational parameter of a supply chain simulation model, the supply chain simulation model being a transaction-level model representative of a digital order fulfillment process within a retail supply chain network, the selection of the first operational parameter including a default value for the first operational parameter and an experimental value for the first operational parameter that is different from the default value;
    simulating execution of a set of predicted digital orders within the retail supply chain network using the supply chain simulation model as modified in accordance with the first operational parameter, wherein simulating execution of the set of predicted digital orders includes:
        retrieving historical order information and demand guidance from an external data store;
        connecting to one or more live data feeds supplying live supply chain network data;
        based on at least the live supply chain network data, using the supply chain simulation model and the default value for the first operational parameter to generate a baseline scenario of transaction-level operation of the retail supply chain network; and
        based on the historical order information and demand guidance, performing one or more additional simulations executing the set of predicted digital orders using the supply chain simulation model and the experimental value for the first operational parameter to generate one or more modified scenarios of transaction-level operation of the retail supply chain network;
    for the baseline scenario and each of the one or more simulations executing the set of predicted digital orders, aggregating transaction level data along a first vector for a plurality of predicted metrics associated with each of a cost, a capacity, and a guest experience for the digital order fulfillment process to generate a scenario evaluation;
    comparing the scenario evaluation for each of the one or more simulations executing the set of predicted digital orders with the scenario evaluation for the baseline scenario by determining a difference in predicted metrics between the baseline scenario and each of the one or more simulations executing the set of predicted digital order; and
    displaying, on a user interface, results based on comparing the scenario evaluations, wherein the results are displayed in one or more of a graphical and tabular format.

2. The method of claim 1, further comprising:
    storing the scenario evaluation for each of the one or more simulations executing the set of predicted digital orders in a memory in association with the experimental value for the first operational parameter.

3. The method of claim 1, wherein the results displayed on the user interface are representative of an aggregated comparison of the scenario evaluations across the same set of predicted digital orders.

4. The method of claim 1, wherein the supply chain simulation model includes a simulation layer having an order simulation engine configured to use the historical order information and demand guidance to simulate execution of predicted future orders received within the retail supply chain network.

5. The method of claim 4, wherein the supply chain simulation model includes a simulation layer having a promise engine configured to receive a plurality of simulated orders from the order simulation engine, the promise engine defining a service level based on a simulated availability of items within the retail supply chain network.

6. The method of claim 5, wherein the supply chain simulation model includes a simulation layer configured to model a fill rate representative of item location information at each of a plurality of nodes within the supply chain network and to model capacity for items at each of the plurality of nodes based on a known node capacity.

7. The method of claim 6, wherein the supply chain simulation model includes a simulation layer configured to select a node from the plurality of nodes within the retail supply chain for simulated fulfillment of each of the plurality of simulated orders based on a defined service level for each of the plurality of simulated orders provided from the promise engine, in combination with the modeled fill rate and modeled capacity at each node.

8. The method of claim 7, wherein the supply chain simulation model includes a simulation layer configured to simulate a carrier allocation for fulfilling each of the plurality of simulated orders from each of the assigned, simulated nodes based at least in part on serviceability of the respective simulated order, the serviceability being based on at least a carrier rate and a carrier assignment for the respective simulated order.

9. The method of claim 1, wherein the first operational parameter is one of node of origin location, carrier selection, box size, carrier rate, and shipping cost.

10. The method of claim 1, wherein the plurality of simulations is a plurality of monte carlo simulations using randomly selected values for the experimental value for the first operational parameter.

11. The method of claim 1, wherein the displayed results include a recommendation for a supply chain network decision associated with the first operational parameter.

12. The method of claim 1, further comprising:
    storing the one or more modified scenarios of transaction-level operation of the retail supply chain network; and
    for at least one of the one or more modified scenarios of transaction-level, aggregating transaction level data along a second vector for a plurality of predicted metrics to generate a second scenario evaluation different from the scenario evaluation generated by aggregating transaction level data along the first vector.

13. The method of claim 2, wherein each predicted metric is indexed for storage in the memory, the method further comprising:
comparing the predicted metrics of the stored scenario evaluations generated by the supply chain simulation model modified in accordance with the first operational parameter with scenario evaluations generated by the supply chain simulation model modified in accordance with a second operational parameter.

14. A system for simulating a plurality of digital orders within a supply chain network, the system comprising:
a computing system including a data store, a processor, and a memory communicatively coupled to the processor, the memory storing instructions executable by the processor to:
receive a selection of a first operational parameter of a supply chain simulation model, the supply chain simulation model being a transaction-level model representative of a digital order fulfillment process within a retail supply chain network, the selection of the first operational parameter including a default value for the first operational parameter and an experimental value for the first operational parameter that is different from the default value;
simulate execution of a set of predicted digital orders within the retail supply chain network using the supply chain simulation model as modified in accordance with the first operational parameter, wherein simulating execution of the set of predicted digital orders includes:
retrieve historical order information and demand guidance from an external data store;
connect to one or more live data feeds supplying live supply chain network data;
based on at least the live supply chain network data, use the experimental model and the default value for the first operational parameter to generate a baseline scenario of transaction-level operation of the retail supply chain network; and
based on the historical order information and demand guidance, perform one or more additional simulations executing the set of predicted digital orders using the experimental model and the experimental value for the first operational parameter to generate one or more modified scenarios of transaction-level operation of the retail supply chain network;
for the baseline scenario and each of the one or more simulations executing the set of predicted digital orders, aggregate transaction level data for a plurality of predicted metrics associated with each of a cost, a capacity, and a guest experience for the digital order fulfillment process to generate a scenario evaluation;
compare the scenario evaluation for each of the one or more simulations executing the set of predicted digital orders with the scenario evaluation for the baseline scenario by determining a difference in predicted metrics between the baseline scenario and each of the one or more simulations executing the set of predicted digital order; and display, on a user interface, results based on comparing the scenario evaluations, wherein the results are displayed in one or more of a graphical and tabular format.

15. The system of claim 14, wherein the supply chain simulation model includes a simulation layer having an order simulation engine configured to use the historical order information and demand guidance to simulate future orders received within the retail supply chain network.

16. The system of claim 15, wherein the supply chain simulation model includes a simulation layer having a promise engine configured to receive a plurality of simulated orders from the order simulation engine, the promise engine defining a service level based on a simulated availability of items within the retail supply chain network.

17. The system of claim 16, wherein the supply chain simulation model includes a simulation layer configured to model a fill rate representative of item location information at each of a plurality of nodes within the supply chain network and to model capacity for items at each of the plurality of nodes based on a known node capacity.

18. The system of claim 17, wherein the supply chain simulation model includes a simulation layer configured to select a node from the plurality of nodes within the retail supply chain for simulated fulfillment of each of the plurality of simulated orders based on a defined service level for each of the plurality of simulated orders provided from the promise engine, in combination with the modeled fill rate and modeled capacity at each node.

19. The system of claim 18, wherein the supply chain simulation model includes a simulation layer configured to simulate a carrier allocation for fulfilling each of the plurality of simulated orders from each of the assigned, simulated nodes based at least in part on serviceability of the respective simulated order, the serviceability being based on at least a carrier rate and a carrier assignment for the respective simulated order.

20. A method for simulating fulfillment of digital orders within a retail supply chain network, the method comprising:
receiving a selection of a first operational parameter of a supply chain simulation model, the supply chain simulation model being a transaction-level model representative of a digital order fulfillment process within a retail supply chain network, the selection of the first operational parameter including a default value for the first operational parameter and an experimental value for the first operational parameter that is different from the default value;
simulating execution of a set of predicted digital orders within the retail supply chain network using the supply chain simulation model as modified in accordance with the first operational parameter, wherein simulating execution of the set of predicted digital orders includes:
receive at an order simulation engine one or more previous orders and demand guidance indicative of future orders received within the retail supply chain network;
receive at a promise engine, a plurality of simulated orders from the order simulation engine, the promise engine defining a service level based on a simulated availability of items within the retail supply chain network;
model a fill rate representative of item location information at each of a plurality of nodes within the retail supply chain network;

model capacity for items at each of the plurality of nodes within the retail supply chain network based on a known node capacity;

select a node from the plurality of nodes within the retail supply chain for simulated fulfillment of each of the plurality of simulated orders based on a defined service level for each of the plurality of simulated orders provided from the promise engine, in combination with the modeled fill rate and modeled capacity at each node; and simulate a carrier allocation for fulfilling each of the plurality of simulated orders from each of the assigned, simulated nodes based at least in part on serviceability of the respective simulated order, the serviceability being based on at least a carrier rate and a carrier assignment for the respective simulated order, wherein the first operational parameter is one of service level, item node location information, node capacity, carrier rate, and carrier assignment and simulating execution of the set of predicted digital orders includes using the default value for the first operational parameter to simulate a baseline scenario and using the experimental value for the first operational parameter to generate one or more modified scenarios; and aggregating transaction level data from each of the plurality of simulated orders in the set of predicted digital orders for a plurality of predicted metrics associated with each of a cost, a capacity, and a guest experience for the digital order fulfillment process to generate a scenario evaluation for the baseline scenario and the one or more modified scenarios;

comparing the scenario evaluation for each of the one or more modified scenarios with the scenario evaluation for the baseline scenario by determining a difference in predicted metrics; and displaying, on a user interface, results based on comparing the scenario evaluations, wherein the results are displayed in one or more of a graphical and tabular format.

* * * * *